(12) United States Patent
Chen et al.

(10) Patent No.: US 10,581,987 B2
(45) Date of Patent: *Mar. 3, 2020

(54) APPLICATION NETWORK USAGE MANAGEMENT

(71) Applicant: AirWatch LLC, Atlanta, GA (US)

(72) Inventors: Lucas Chen, Atlanta, GA (US); Deep Singh, Atlanta, GA (US); Iury Bessa, Atlanta, GA (US); Rajiv Singh, Atlanta, GA (US)

(73) Assignee: AIRWATCH LLC, Atlanta, GA (US)

( * ) Notice: Subject to any disclaimer, the term of this patent is extended or adjusted under 35 U.S.C. 154(b) by 597 days.

This patent is subject to a terminal disclaimer.

(21) Appl. No.: 15/131,067

(22) Filed: Apr. 18, 2016

(65) Prior Publication Data

US 2017/0302551 A1 Oct. 19, 2017

Related U.S. Application Data

(60) Provisional application No. 62/189,188, filed on Jul. 6, 2015.

(51) Int. Cl.
*H04L 12/26* (2006.01)
*H04L 29/08* (2006.01)

(52) U.S. Cl.
CPC .............. *H04L 67/22* (2013.01); *H04L 67/06* (2013.01)

(58) Field of Classification Search
CPC ... H04L 43/062; H04L 43/0876; H04L 67/22; H04L 67/06
See application file for complete search history.

(56) References Cited

U.S. PATENT DOCUMENTS

| 9,438,491 B1* | 9/2016 | Kwok | H04L 43/065 |
| 9,639,412 B1* | 5/2017 | Levy | H04L 43/065 |
| 2007/0209005 A1* | 9/2007 | Shaver | G06F 17/3089 715/733 |
| 2011/0231551 A1* | 9/2011 | Hassan | H04L 12/1421 709/226 |
| 2012/0117478 A1* | 5/2012 | Vadde | G06F 9/54 715/736 |

(Continued)

OTHER PUBLICATIONS

Office Action dated May 4, 2017 for U.S. Appl. No. 14/792,652.

(Continued)

*Primary Examiner* — Moustafa M Meky
*Assistant Examiner* — Kidest Mendaye
(74) *Attorney, Agent, or Firm* — Thomas | Horstemeyer, LLP

(57) ABSTRACT

Disclosed are various embodiments for monitoring network usage by client devices and enforcing compliance rules related thereto. A management component of a client application can be provided to identify a first function call made in the source code of the client application to invoke a media player function on the client device associated with a playback of media content received over a carrier network. The first function call can be replaced with a second function call that, when invoked during an execution of the client application, causes a device to identify a size of the media content received by the client device over the carrier network; communicate the size of the media content received by the client device to a remote computing service; and provide the media content for playback on the client device.

20 Claims, 12 Drawing Sheets

(56) References Cited

U.S. PATENT DOCUMENTS

| | | | |
|---|---|---|---|
| 2012/0198046 A1* | 8/2012 | Shah | G06Q 30/04 709/224 |
| 2013/0260713 A1* | 10/2013 | Toy | H04L 12/1403 455/406 |
| 2014/0024339 A1* | 1/2014 | Dabbiere | H04M 15/885 455/406 |
| 2014/0032691 A1* | 1/2014 | Barton | H04L 41/00 709/206 |
| 2014/0378091 A1 | 12/2014 | Irwin et al. | |
| 2015/0052595 A1* | 2/2015 | Murphy | G06F 21/44 726/7 |
| 2015/0117226 A1 | 4/2015 | Kim et al. | |
| 2015/0120861 A1 | 4/2015 | Huang et al. | |
| 2015/0215816 A1 | 7/2015 | Abou-Elkheir et al. | |
| 2015/0326497 A1* | 11/2015 | Guionnet | G06Q 10/06 709/224 |
| 2015/0363289 A1 | 12/2015 | Brough | |
| 2016/0127210 A1 | 5/2016 | Noureddin et al. | |

OTHER PUBLICATIONS

Office Action dated for U.S. Appl. No. 14/792,561.
Final Office Action for U.S. Appl. No. 14/792,562 dated Sep. 21, 2017.

* cited by examiner

```
#import <objc/runtime.h>

@implementation UIViewController (Tracking)
```
262 — `+(void)load` `{`
```
    static dispatch_once_t onceToken;
    dispatch_once(&onceToken, ^{
        Class class = [self class];
```
248 — 
```
        SEL oldSelector = @selector(exampleFunction:);
        SEL newSelector = @selector(mod_exampleFunction:);
```
```
        Method oldMethod = class_getInstanceMethod(class, oldSelector);
        Method newMethod = class_getInstanceMethod(class, newSelector);

...
```
252 — `method_exchangeImplementations(oldMethod, newMethod);`
```
    });
}
```
255 — 
```
// Define Modified Function
-(void)mod_exampleFunction: {
```
258 —
```
    // Get Size of Data Received/Transmitted Here
    // Send Size of Data to Management Service
    // Perform Additional Operations Here
    // Call Original Function (e.g., exampleFunction);
}

@end
```

FIG. 2C

APPLICATION NETWORK USAGE MANAGEMENT

CROSS-REFERENCE TO RELATED APPLICATIONS

This application claims the benefit of and priority to U.S. Provisional Patent Application No. 62/189,188, entitled "Application Network Usage Management," filed on Jul. 6, 2015, and co-pending U.S. patent application Ser. No. 14/792,562, entitled "Application Network Usage Management," filed on Jul. 6, 2015, the contents of which are hereby incorporated by reference herein.

BACKGROUND

Employees of enterprises often use client devices, such as smartphones and laptops, for work purposes. Client devices can require connectivity to a network through which the applications can send and receive data. Monitoring network usage by client devices and applications to account for the cost of network usage can be desirable. However, many client devices and applications are not capable of adequately monitoring network usage. Additionally, many client devices and applications do not provide mechanisms for evaluating and enforcing compliance rules that are violated by certain types or levels of network usage.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 2C is example pseudocode of a management component according to various examples of the present disclosure.

DETAILED DESCRIPTION

Figure 1:
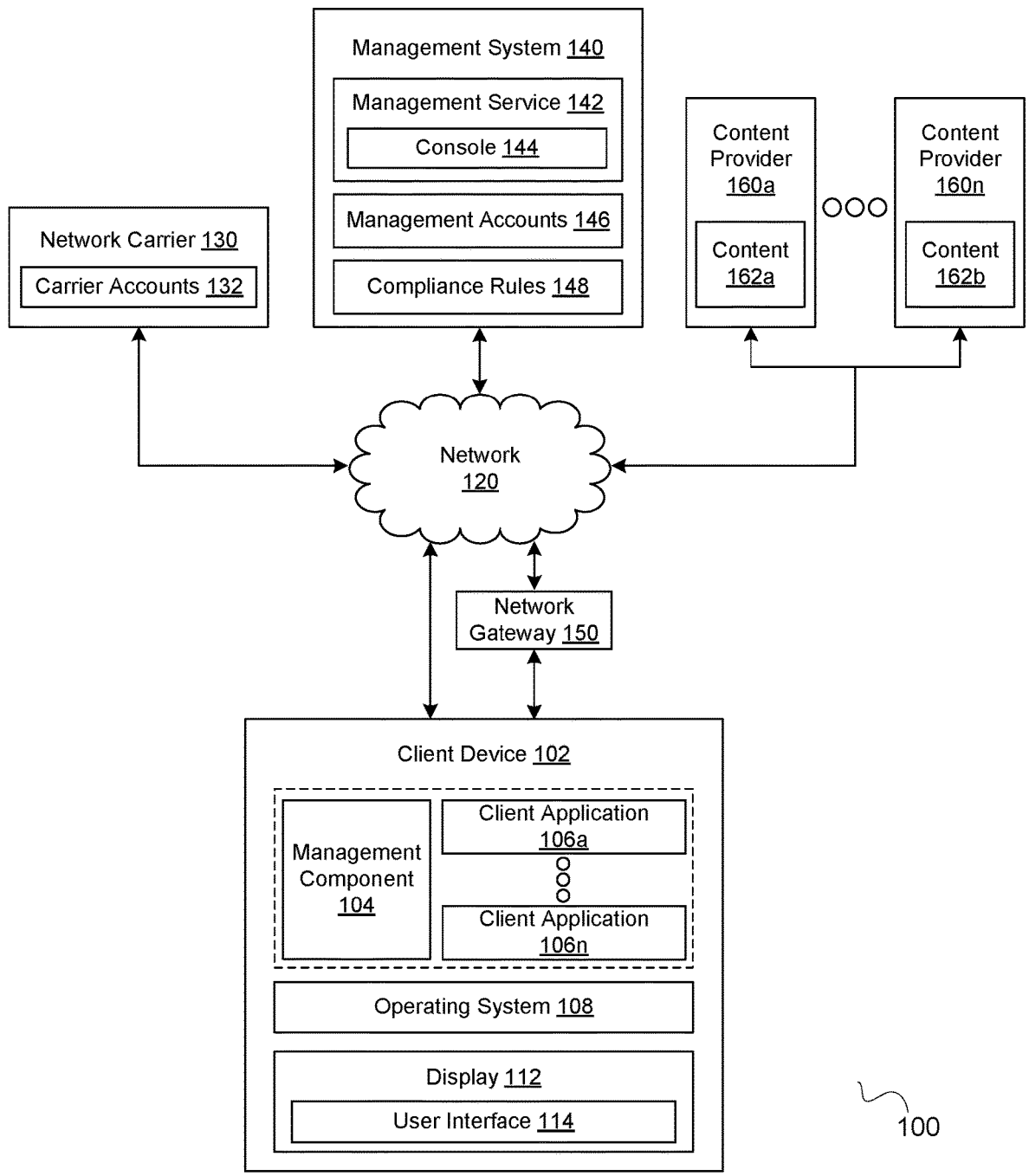
FIG. 1 is a drawing of a networked environment according to various examples of the disclosure.

The present disclosure relates to monitoring network usage by client devices and enforcing compliance rules. With the emergence of bring-your-own-device (BYOD) technology, where users bring their personal devices to the workplace to connect to work resources, monitoring the network usage by individual devices can be desirable. For example, employees can be reimbursed for the cost of network usage when the data pertains to work-related functions. However, many types of client devices, operating systems, and applications are not configured to adequately monitor network usage. While some operating systems provide mechanisms to indicate how much network data was used by the client device, the operating systems do not distinguish between data consumed by enterprise-related applications or personal applications. Therefore, a technical problem in the realm of network usage management exists because there are no mechanisms capable of providing network usage on a per application basis. Moreover, operating systems, client devices, and applications do not provide mechanisms to evaluate and enforce compliance rules violated by certain types or levels of network usage.

According to various examples presented herein, a technical solution in network usage management is provided to identify network usage on a per application or application-function basis. In an example scenario, a user of a client device accesses a network to send and receive data which the user can access using a carrier account associated with a network carrier that may provide the network. A carrier account can be allotted a certain amount of network usage, such as a predefined amount of data consumption through uploads and downloads of content. The carrier account can be associated with a data plan that is replenished to a certain data allotment, for example, on the first day of a billing cycle or at another predefined time. Alternatively, the carrier account can be replenished in an ad hoc manner at the request of an administrator of the carrier account.

A carrier account can be specific to one or more particular client devices, such that only particular client devices can consume data over the network using the data allotment. An owner of a client device having a carrier account is usually charged by the carrier for an amount of data used by the client device that is over the carrier network. With the emergence of BYOD technology, an enterprise can permit an employee to use his or her device to access enterprise data, such as corporate email, documents, audio and video content, and other data. However, the owner of a device is typically required to pay for data consumed for enterprise-related use. Examples provided herein provide mechanisms to distinguish between data used for personal- and enterprise-related tasks.

A user of a client device can use various client applications (executed by the client device) to access content in the form of data provided over a network. For instance, an employee of an enterprise can use her smartphone to access her corporate email account, which can require the smartphone to send and receive content from a content provider, such as Microsoft Exchange®. Additionally, the employee can use a tablet to access a content repository, which can require the tablet to send and receive content from another content provider, such as Microsoft SharePoint®.

The client applications that access content from content providers might not be configured to analyze the amount of data consumed over the network. In particular, the client applications might not be instrumented to analyze content for network usage. Additionally, the client applications might delegate the network operations required to access a network to an operating system of the client device. Like the client applications, the operating system of the client device might not be instrumented to analyze the content for network usage.

To overcome the challenge presented by a lack of a mechanism that monitors network or data usage on a per-application or per-application-function basis, a management component can be provided to analyze the content for network usage. In some examples, the management component can intercept network calls, such as method or function calls that provide network capability, made by client applications to the operating system of the client device.

The management component can provide the modified network call to the operating system. The operating system can receive the modified network call and can execute the modified network call. The modified network call, when executed, can cause the operating system to establish a communication channel with the content provider through a network interface of the client device, receive content from the content provider over the communication channel, and transmit the content to the management component. The management component can receive the content from the operating system and analyze the content for network usage before returning the content to the client application.

In other examples, the management component can identify function calls invoked by client applications that affect network usage, such as a function call invoked by a media player application associated with a playback of content received over the carrier network. The function call can include a call made to play, pause, stop, resume, or other suitable action that affects the playback of the content on the client device. In this example, the management component can identify a function call made by a client application that invokes a media player function on the client device. The management component can replace the function call with a call to another function capable of identifying the size of the content received by the client device over the carrier network as a result of the function call. The management component can then provide the content to the requesting client application.

For instance, a management component can identify network calls in source code of a client application at compile-time or object code of a client application at run-time made to the NSURLSession or NSURLConnection Objective-C classes. Calls to these classes, during execution of a client application, are transmitted by a client application to an Apple iOS® operating system. The management component can modify or replace the function call in the source code or object code with another function call that provides the same or similar result to the requesting client application. However, the function called during execution of the client application can also identify the size of the content received by the client device over the carrier network as a result of the function call. As a result, network usage can be monitored on a per-application or application-function basis.

Additionally, the management component can report the network usage to a management service. The management service can log the network usage in a management account, which can be associated with a user, a client device, or a carrier account. The management account can contain historical reports of network usage by client applications, which can be aggregated by user, client device, or carrier account. The management service can notify an administrator or user of the management account when the network usage associated with the management account violates compliance rules. The management service can also perform other remedial actions when the network usage associated with the management account violates compliance rules, such as disabling network access or replenishing the data allotment of the associated carrier account.

Turning now to the figures, with reference to FIG. 1, shown is a networked environment 100 according to various examples. The networked environment 100 can include a client device 102, a network carrier 130, a management system 140, a network gateway 150, and a plurality of content providers 160A . . . 160N, which can be in data communication with one another over a network 120. The network 120 can include, for example, the Internet, one or more intranets, extranets, wide area networks (WANs), local area networks (LANs), wired networks, wireless networks, other suitable networks, or any combination of two or more like networks. For example, the networks can include satellite networks, cable networks, Ethernet networks, and other types of networks.

In some examples, the network 120 can be provided by a network carrier 130. The network carrier 130 can provide one or more of a cellular network and a local access network (LAN). The network carrier 130 can provide network access to users or client devices 102 that are associated with a carrier account 132. The network carrier 130 can store carrier accounts 132 in a data store accessible to the network carrier 130. The network carrier 130 can update the carrier accounts 132 upon network usage by users or client devices 102 associated with the carrier accounts 132.

In some examples, a carrier account 132 can be specific to a client device 102, such that only that client device 102 can use the carrier account 132 to access the network 120. In other examples, a carrier account 132 can be specific to a user, such that any client device 102 associated with the user can use the carrier account 132 to access the network 120. A carrier account 132 can also be specific to a group of users (i.e., a "pooled account"), such that any client device 102 associated with any of the users can use the carrier account 132 to access the network 120. For instance, the members of a pooled carrier account can include the members of a management grouping stored by the management service 142.

The carrier account 132 can be associated with a data allotment (i.e., an amount of data that the owner of the carrier account 132 is permitted to consume or use over the network 120). In response to a carrier account owner consuming data over the network 120, the data allotment of the carrier account 132 can be reduced in an amount equal to the amount of data consumed. If the carrier account owner seeks to access a resource over the network 120 that is larger than the data allotment of her carrier account 132, the action can be prohibited until an administrator of the carrier account 132 replenishes the data allotment of the carrier account 132 to an amount greater than or equal to the size of the resource.

The network carrier 130 can include an API through which the management component 104 and a remote computing service, such as the management service 142, can send commands to the network carrier 130. In some examples, a request to replenish a particular carrier account 132 to a particular data allotment can be transmitted to the network carrier 130 through the API to cause the network carrier 130 to replenish the data allotment of the carrier account 132. Additionally, the network carrier 130 and the management service 142 can establish a communication channel through which information contained in carrier accounts 132 and management accounts 146 can be synchronized.

In some examples, carrier accounts 132 can be replenished according to a "data plan" such that the carrier account 132 is replenished to a particular data allotment on the first day of a billing cycle associated with the data plan. For instance, a carrier account 132 can be replenished to a 3 GB data allotment on the first day of the month if the carrier account owner has subscribed to a 3 GB/month data plan with a first day of the month billing date. Additionally, in some examples, carrier accounts 132 can be replenished on an ad-hoc basis in response to a request by an administrator of the carrier account (or a carrier account owner) requesting a particular data allotment replenishment. For example, a carrier account owner can purchase a 2 GB data allotment and can apply it to her carrier account 132 whenever she notices that her data allotment is running low.

In some examples, a client device 102 can be configured to access the network 120 through a network gateway 150. The network gateway 150 can proxy data between the client device 102 and the content providers 160 (i.e., act as a network end-point and relay data between the two actual end-points—the client device 102 and the content providers 160). The network gateway 150 can analyze the proxied data for network usage and report information describing the network usage to the management service 142 or the management component 104.

The client device 102 can represent a processor-based system, such as a computer system, that can be embodied in the form of a desktop computer, a laptop computer, a personal digital assistant, a cellular telephone, a smartphone, a set-top box, a music player, a web pad, a tablet computer system, a game console, an electronic book reader, or any other device with like capability. The client device 102 can include a processor and a memory including instructions that, when executed by the processor, cause the processor to implement various functionality in the client device 102. For instance, the memory can store an operating system 108, various client applications 106A . . . 106N, and a management component 104, which can be executed by the client device 102.

The client device 102 can include a networking interface that provides networking capability for client applications 106. The networking interface can utilize an antenna system of the client device 102 to access the network 120, such as a (cellular) carrier network. The network interface can access a particular network that a user of the client device or the client device is authorized to access. In particular, the network interface can identify a carrier account associated with a user of the client device or the client device, and can access a network provided by a network carrier that is associated with the carrier account. For instance, a Subscriber Identity Module (SIM) card of the client device 102 can specify a carrier account associated with the client device. The network interface 110 can be invoked by the operating system 108 of the client device 102 in response to receiving a network call from a client application 106. For instance, the Apple iOS® operating system can invoke the network interface in response to receiving a network call belonging to the NSURLSession or NSURLConnection Objective-C classes.

In some examples, the client applications 106 can include productivity applications, Internet browser applications, email client applications, multimedia applications, news applications, navigation applications, game applications, or combinations thereof. For instance, a client application 106 can include an application configured to securely access content 162 from a content provider 160. In particular, the client application 106 can be configured to establish a secure communication channel (e.g., HTTPS/SSL) with a content provider 160, authenticate with the content provider 160 (e.g., using identity management credentials), and receive content 162 from the content provider 160.

The various content providers 160A . . . 160N accessible to the client device 102 over the network 120 can store various content 162A . . . 162N. For instance, a content provider 160A can include an email server, which can store content 162A that includes email data, calendar data, and contact data. The client applications 106 can be associated with particular content providers 160 based on the type of content 162 required by the client applications 106. For instance, a client application 106A (e.g., an email client) can be configured to access particular content 162A (e.g., email data, calendar data, and contact data) from a particular content provider 160A (e.g., Microsoft Exchange®). Additionally, for example, a client application 106N (e.g., an application configured to securely render content 162) can be configured to access content 162 from multiple content providers 160, such as content 162B (e.g., documents) stored by a content provider 160B (e.g., DropBox®) and content 162N (e.g., videos) stored by a content provider 160N (e.g., YouTube.com®).

The client applications 106 can delegate the network operations associated with accessing content 162 from content providers 160 to the operating system 108 of the client device 102. In particular, the client applications 106 can be configured to transmit a network call to the operating system 108 to cause the operating system 108 to establish a communication channel with a content provider 160, request content 162 from the content provider 160, receive the content 162 from the content provider 160, and transmit the content 162 to the client application 106.

The operating system 108 of the client device 102 can further execute a management component 104 stored by the client device 102. In some examples, the management component 104 can manage the client device 102 on behalf of the management service 142. That is, the management component 104 can implement instructions of the management service 142 at the client device 102 (on behalf of the management service 142). The management component 104 can communicate with the management service 142 over the network 120 using a secure communication channel. Over the secure communication channel, the management component 104 can receive commands from the management service 142 to implement at the client device 102, and the management component 104 can transmit status information describing the client device 102 to the management service 142.

In some examples, the management component 104 can control use of the client device 102 by configuring the client device 102. For example, the management component 104 can install configuration profiles on the client device 102, which can cause the operating system 108 of the client device 102 to operate in accordance with the specifications of the configuration profiles. Additionally, for instance, the management component 104 can transmit commands to application programming interfaces of the operating system 108 or client applications 106 that cause the operating system 108 or client applications 106 to perform certain functionality.

In some examples, the management component 104 can monitor use of the client device 102. For example, the management component 104 can detect when client applications 106 transmit network calls to the operating system 102. In some examples, the management component 104 can determine whether the use of the client device 102 complies with compliance rules 148. For example, the management component 104 can determine that a compliance rule 148 prohibits network calls from being transmitted to the operating system 102 without modification where the content is returned to the management component 104 rather than the client application 106 that initially generated the network call. Further, the compliance rule 148 can be limited to network calls transmitted by particular client applications 106 so that network calls transmitted by certain applications are not subject to the compliance rule 148.

In some examples, the management component 104 can perform remedial actions when use of the client device 102 violates compliance rules 148. For example, the management component 104 can transmit notifications to one or more users of the client device 102 or administrators of the client device 102 specifying that certain compliance rules 148 are violated by the use of the client device 102. Additionally, for instance, the management component 104 can disable certain functionality of the client device 102, such as disabling particular client applications 106 (e.g., by shutting down the client applications 106), disabling access by the client device 102 to a network 120 (e.g., by disabling a network interface of the client device 102), and disabling the client device 102 (e.g., by locking the client device 102 or by erasing at least a portion of the memory of the client device 102).

The management component 104 can be embodied in various types of software. In some examples, the management component 104 can include an agent application, which can have administrative privileges with respect to the client device 102. The management component 104 can, for instance, install a management profile in a profile store of the client device 102 that provides management component 104 with administrative privileges with respect to the client device 102. The management component 104 can, using its administrative privileges, monitor the operations of the client device 102. For instance, the management component 104 can listen for method calls transmitted from client applications 106 to the operating system 108 of the client device 102.

The management component 104 can also use its administrative privileges to control the operation of the client device 102. For instance, the management component 104 can intercept network calls transmitted by certain client applications 106 to the operating system 108 and can modify the network calls to return content to the management component 104, rather than the client applications 106. Additionally, the management component 104 can transmit commands to an application programming interface of operating system 108 that cause the operating system 108 to perform certain operations on its behalf. For instance, the management component 104 can transmit a command that causes the operating system 108 to disable a network interface of the client device 102 (thereby preventing access to the network 120).

In some examples, the management component 104 can be executable instructions that are injected into a client application 106, which causes the functionality of the client application 106 to be modified. For instance, the management component 104 can be a software developers kit (SDK) that a developer of a client application 106 can include in the client application 106 before the source code of the client application 106 is compiled into binary code executable by the client device 102. Alternatively, for example, the management component 104 can include an application wrapper with which a client application 106 can be wrapped. In particular, the client application 106 can be wrapped by injecting the application wrapper (i.e., binary code) into the binary code of a client application 106 that has been compiled previously.

In any case, once combined with a client application 106 (either as an SDK or an application wrapper), the management component 104 can control use of the client application 106. Additionally, the management component 104 can modify method calls to cause the operating system 108 to perform a different operation than requested by a client application 106. For example, the management component 104 can modify network calls belonging to the NSURLSession or NSURLConnection Objective-C classes such that the network calls cause content 162 fetched from content providers is returned to the management component 104, rather than to the client application 106 that generated the original network call.

In response to the operating system 108 executing the modified network call, the management component 104 can receive content 162 from the operating system 108. The management component 104 can store the content 162 in memory accessible to the management component 104. In some examples, the management component 104 can store the content 162 in memory that is inaccessible to the client application 106 or can otherwise enforce access control over the content 162. For instance, the management component 104 can encrypt the content 162 with an encryption key to which the client application 106 does not have access, preventing the client application 106 from decrypting (and accessing) the content 162. This can be particularly useful for examples where the management component 104 is embodied as an SDK or application wrapper, as the management component 104 may use the same storage space as the client application 106. Additionally, for example, the management component 104 can instruct the operating system 108 to prevent the client application 106 from having the privilege to access the storage location containing the content 162.

The management component 104 can analyze the content 162 for network usage (i.e., the amount of data consumed over the network 120 to fetch the content 162 from the content provider 160) and create a network usage analysis. In some examples, the network usage analysis can include one or more properties that describe an instance of network usage by the client device 102. In some examples, a network usage analysis can include one or more of: a record identifier (ID), a client device ID, an application ID, a personal use indicator, an enterprise use indicator, a content provider ID (e.g., IP address, domain name, or URL), a content ID, a content type, a session duration, a bytes received quantity, a packets received quantity, a bytes transmitted quantity, a packets transmitted quantity, a network carrier ID, a cellular network indicator, a Wi-Fi network indicator, a roaming indicator, a mobile country code (MCC), or a mobile network code (MNC).

The management component 104 can populate the network usage analysis by identifying data from one or more sources and associating the data with the properties described above. For example, the management component 104 can query a table of aggregated network usage analyses to determine the last used record ID, can add one number to the last used record ID, and can populate the record ID property of the instant network usage analysis with the newly created record ID. Alternatively, the management component 104 can request a newly created record ID from the management service 142, which can store a table of aggregated network usage analyses from which it can identify a last used record ID of which to base the newly created record ID.

Additionally, the management component 104 can request that the operating system 108 provide the management component 104 with certain data describing the network usage. In some examples, the management component 104 can transmit method calls to the operating system 108 that cause the operating system 108 to identify particular data requested by the method call and return the data to the management component 104. In any case, the operating system 108 can provide the management component 104 with data describing the client device 102, such as an IMEI number or other hardware identifier. Additionally, the operating system 108 can provide the management component 104 with certain data describing the network 120 used by the client device 102, such as a network carrier ID (or name), a cellular network indicator (i.e., indication that the network was a cellular network), a Wi-Fi network indicator (i.e., indication that the network was a Wi-Fi network), a roaming indicator (i.e., indication that the network was roaming), a MCC, and a MNC. In some examples, the operating system 108 can identify the data (to provide the management component 104) by querying the network interface of the client device 102, or by querying the SIM card of the client device 102. Once the management component 104 receives the data from the operating system 108, the management component 104 can populate the network usage analysis with the relevant properties.

Furthermore, the management component 104 can identify certain data describing the network usage by analyzing the network call that the client application 106 transmitted to the operating system 108 (which the management component 104 intercepts). For instance, the management component 104 can identify a source parameter of the network call (i.e., the source of the network call or a particular client application 106), and can associate the source parameter with an application ID. In some examples, the application ID can be an application bundle identifier (e.g., com.sports, sports.app), an application name (e.g., Sports). The data describing the network usage can be identified as a parameter of a network or function call, such as a content provider ID (e.g., IP address, domain name, URL), content ID, or other parameter.

Also, the management component 104 can, in some examples, populate a personal use indicator (i.e., indication that the content 162 was consumed for personal reasons) and an enterprise use indicator (i.e., indication that the content 162 was consumed for enterprise reasons) based on the client application 106 (or its respective application ID). For instance, some client applications 106 can only be used for personal uses and some client applications 106 can only be used for enterprise uses. Accordingly, the management component 104 can parse a table of "enterprise applications" and a table of "personal applications" to determine whether the network usage was personal or enterprise, which can be used to populate the personal use and the enterprise use indicators of the network usage analysis.

The management component 104 can also analyze the network call to identify a content parameter of the network call, and can associate portions of the content parameter with the content ID and the content type properties. For instance, if the content parameter of a network call contains "Report.doc," the management component 104 can populate the content ID property with "Report" based on the file name of the content parameter and can populate the content type with "Microsoft Word document" based on the file extension of the content parameter. The management component 104 can further analyze the network call to identify a content provider parameter of the network call, and can associate portions of the content provider parameter with the content provider ID property. For example, if the content provider parameter of a network call contains "www.SharePoint.com," the management component 104 can populate the content provider ID with either "www.SharePoint.com" or "SharePoint®."

Once the content provider ID, the content ID, and the content type are identified, the management component 104 can populate the personal use indicator and the enterprise use indicator based on one or more of these properties. That is, certain content provider IDs, certain content IDs, and certain content types can suggest that a network usage was personal use or that the network usage was enterprise use. For instance, content provider IDs such as "YouTube.com®," content IDs such as "JurassicWorld," or content types of "Video" can suggest that the network usage was a personal use. On the contrary, content provider IDs such as "Enterprise Development Repository," content IDs such as "Version8SourceCode," or content types of "Source Code" can suggest that the network usage was an enterprise use. Consequently, the management component 104 can parse a "personal use" listing and an "enterprise use" listing to determine whether, based on one or more of the content provider ID, the content ID, and the content type associated with the network usage, either the personal usage indicator or enterprise usage indicator should be populated in the network usage analysis.

In some examples, a parameter, such as a content provider ID or a content ID, can be employed to override predefined assumptions made based on an application ID. This can be employed to identify personal uses of enterprise application or enterprise uses of personal applications. For example, a content provider ID of "Enterprise Development Repository" may be associated with an enterprise use an all data usage by the application can be deemed enterprise use. In one example, however, if a content ID requested by the application includes "JurassicWorld," or content type indicative of a personal use, the assumption that the application was used for enterprise can be modified to personal use.

Finally, the management component 104 can identify certain data describing the network usage by analyzing the content 162 sent to or received from the content provider 160. In some examples, content 162 (e.g., files, data) can be transmitted over a network 120 by breaking the content 162 up into a plurality of data packets. The plurality of data packets can be transmitted over the network 120 during a transmission session, which can begin when the first data packet of the content 162 is sent over the network 120 and when the last data packet is sent over the network 120. At the conclusion of the transmission session, the operating system 108 (or client application 106) can reassemble the data packets into the content 162 (i.e., to form the content data object).

Each data packet can include a header that stores information describing the data packet. In some examples, the management component 104 can analyze the header of each data packet transmitted over the network 120 during a transmission session to determine the network usage related to the transmission of the content 162 over the network. The management component 104 can identify the size of all data packets transmitted from the client device 102 to the content provider 160 during the transmission session, and can populate the bytes transmitted quantity property by summing the sizes of the data packets transmitted and can populate the packets transmitted quantity property by summing the number of data packets transmitted.

Similarly, the management component 104 can identify the size of all data packets received by the client device 102 from the content provider 160 during the transmission session, and can populate the bytes received quantity property by summing the sizes of the data packets received and can populate the packets received quantity property by summing the number of data packets received. Furthermore, by analyzing the header to determine the time that each data packet was sent or received by the client device 102, the management component 104 can calculate the length of time that expired between the first data packet and the last data packet to populate the session duration property of the network usage analysis. In other examples, a callback provided after receipt or transmission of one or more data packets can be analyzed to identify the number of bytes of data successfully received or transmitted.

Alternatively, in some examples, the management component 104 can request that a network gateway 150 identify information describing the network usage. As previously described, the client device 102 can be configured to access the network 120 through the network gateway 150, which can monitor the network traffic between the client device 102 and content providers 160. For instance, the network gateway 150 can monitor the network traffic to identify a content provider ID, a content ID, and a content type with which to populate the network usage analysis. For instance, the network gateway 150 can identify a content provider ID by analyzing the network traffic to identify a URL to which the content 162 was sent (in the case that the client device 102 uploaded content 162 to the content provider 160) or from which the content 162 was received (in the case that the client device 102 downloaded content 162 from the content provider 160). The network gateway 150 can, for example, identify a content ID and content type by analyzing the network traffic for a file name associated with the sent or received content 162, and can associate the portion excluding the file extension with the content ID and associate the portion including the file extension with the content type. Furthermore, based on the content provider ID, content ID, and content type, the network gateway 150 can parse an a "personal content" listing and an "enterprise content" listing to identify information suggesting that the personal use indicator or the enterprise use indicator should be populated.

Also, similar to the management component 104, the network gateway 150 can analyze the data packets transmitted to and from the client device 102 to identify information in the header of the data packets that is correlated with one or more properties of the network usage analysis. The network gateway 150 can instruct the management component 104 to populate the respective properties of the network usage analysis with the information, or can create a network usage analysis itself. By analyzing the data packets, the network gateway 150 can identify a session duration, a bytes received quantity, a packets received quantity, a bytes transmitted quantity, and a packets transmitted quantity.

In any case, the management component 104 can create the data usage analysis in accordance with one or more privacy setting. In some examples, an administrator or a user of a management account 146 can configure a privacy setting through the console 144 of the management service 142, which can specify that certain data should not be collected. For instance, a privacy setting can specify that information related to one or more of the following properties should not be collected: client device ID, application ID, personal use indicator, enterprise use indicator, content provider ID, content ID, content type, session duration, bytes received quantity, packets received quantity, bytes transmitted quantity, packets transmitted quantity, network carrier ID, cellular network indicator, Wi-Fi network indicator, roaming indicator, MCC, or MNC.

In some examples, the management component 104 can query a listing of privacy settings associated with a management account 146 to determine whether any data describing the network usage should not be collected. If one or more privacy settings indicate that certain data should not be collected, the management component 104 can be configured to not collect particular data and not populate the respective properties of the data usage analysis. For instance, if privacy settings indicate that information related to the carrier network ID and roaming status properties should not be collected, the management component 104 can fail to collect the information and fail to populate the carrier network ID and roaming status properties in data usage analysis.

Once the network usage analysis is created, the management component 104 can provide the content 162 to the client application 106. In some examples, the management component 104 can transmit the content 162 to the client application 106 using a secure inter-process communication channel. Alternatively, the management component 104 can release an access control over the content 162 to allow the client application 106 to access the content 162, such as by decrypting the content 162 or by instructing the operating system 108 to provide the client application 106 with access rights to the storage location of the content 162.

The management system 140 can be a computing environment operated by one or more enterprises, such as businesses or other organizations, to manage the use of at least one client device 102. The management system 140 can include a computing device, such as a server computer, that provides computing capabilities. Alternatively, the management system 140 can include multiple computing devices arranged in one or more server banks or computer banks. For examples in which the management system 140 includes multiple computing devices, the computing devices can be located in a single installation, or the computing devices can be distributed among multiple different geographical locations.

In some examples, the management system 140 can include computing devices that together form a hosted computing resource or a grid computing resource. In other examples, the management system 140 can operate as an elastic computing resource for which the allotted capacity of computing-related resources, such as processing resources, network resources, and storage resources, can vary over time. In other examples, the management system 140 can include or be operated as one or more virtualized computer instances that can be executed in order to perform the functionality that is described herein.

The management system 140 can include various systems that facilitate management of one or more client devices 102. The management system 140 can include a management service 142 that can perform various management operations. For instance, the management service 142 can perform several operations to bring a client device 102 into management (i.e., enrolling the client device 102). The management service 142 can establish a trust with the client device 102 through an installation of a management component 104 on the client device 102, such as a management profile that can be installed in a profile store of the client device 102. Additionally, the management service 142 can establish a secure communication channel with a management component 104 installed on the client device 102, such as with a management component 104 that includes an agent application or a management component 104 that is injected into a client application 106 through a SDK or application wrapper.

The management service 142 can store a plurality of management accounts 146, which can be specific to various client devices 102 or users of client devices 102. That is, a management account 146 can be associated with a certain user (and her respective client devices 102). Alternatively, a management account 146 can be associated with a certain client device 102 and one or more users of such client device 102, such as when the client device 102 is a "shared device" amongst a group of users.

A management account 146 can be further associated with at least one carrier account 132. In one example, a management account 146 associated with a client device 102 can be associated with a carrier account 132 based on a relationship between the client device 102 and the carrier account 132. For example, a management account 146 can become associated with a carrier account 132 when a client device 102 associated with the carrier account 132 is enrolled into the management service 142. This can occur, for instance, when an employee of an enterprise enrolls her personal client device 102 (that operates using her personal carrier account 132) into the management service 142 so that she can access enterprise resources using her personal client device. Similarly, a management account 146 associated with a user can be associated with a carrier account 132 based on a relationship between the user and the carrier account 132. For instance, a user and a carrier account 132 can be related in an instance where the carrier account 132 is a pooled carrier account.

In some examples, the management service 142 can create a management account 146 associated with a client device 102 when the client device 102 is enrolled into the management service 142. In any case, the management account 146 can be further associated with one or more carrier accounts 132 that the members (i.e., users or client devices 102) of the management account 146 can use to access the network 120.

The management account 146 can include information describing the characteristics and state of an associated user, client device 102, or carrier account 132. The management service 142 can update the management account 146 in response to changes to the characteristics or state of an associated user, client device 102, or carrier account 132. More specifically, the management service 142 can query one or more of the management component 104, the operating system 108 of the client device 102, the network gateway 150, and the network carrier 130 to identify information related to characteristics or state of an associated user, client device 102, or carrier account 132, and can add or change information contained in the management account 146 as necessary to keep the information up-to-date.

As an example, the management component 104 can identify that a particular client device 102 has been compromised. The management component 104 can transmit information related to the compromised state of the client device 102 to the management service 142, which can cause the management service 142 to add the information to each management account 146 associated with the client device 102. In particular, the information related to the jailbroken state of the client device 102 can be added to a management account 146 associated with the client device 102 (i.e., a device-specific management account), a management account associated with the user of the client device 102 (i.e., a user-specific management account), and a management account associated with a carrier account 132 to which the client device 102 has access (i.e., a carrier-specific management account).

The management service 142 can provide a console 144, through which the management service 142 can be configured by users with sufficient administrative privileges. The various dashboards, modules, and functionality provided through the console are discussed in further detail with respect to FIGS. 8-12. The console 144 can provide an administrative dashboard and an end-user dashboard. Through the administrative dashboard, an administrator of the management service 142 can manage client devices 102. Through the end-user dashboard, an end-user of the management service 142 can manage management accounts 146 for her various client devices 102. For instance, a user of a client device 102 that is enrolled to the management service 142 can access the end-user dashboard to manage the client device 102, and any other client device 102 that is enrolled with the management service 142 and associated with the user.

In some examples, compliance rules 148 can be defined through the console 144 of the management service 142, which the management service 142 can enforce upon client devices 102 under its management. In some examples, the compliance rules 148 can specify one or more conditions that must be satisfied for particular client devices 102 to be deemed compliant with the compliance rules 148. For instance, a compliance rule 148 can specify that only authorized client applications 106, such as applications listed on a whitelist of authorized applications, should access the network 120. As another example, a compliance rule 148 can specify that a particular client application 106 is only authorized to consume 1 GB of data from a particular carrier account 132 each month. As another example, a compliance rule 148 can specify that a particular user is only authorized to consume 3 GB of data over the network 120 for personal use using her smartphone, tablet, and laptop client devices 102. Additionally, the compliance rules 148 can prohibit any network usage by a user, client device 102, or carrier account 132 from exceeding configurable thresholds, which can be specific to a regular period (e.g., billing cycle, month) and to certain client applications 106. In particular, the compliance rules 148 can prohibit a particular user, client device 102, or carrier account 132 from maintaining a session of a threshold duration, receiving a threshold amount of bytes during a session or a period, receiving a threshold amount of packets during a session or a period, transmitting a threshold amount of bytes during a session or a period, or transmitting a threshold amount of packets during a session or a period.

In any case, the management service 142 can evaluate the compliance rules 148 by obtaining information from various sources and determining whether the information indicates that the compliance rules 148 are violated. In some examples, the management service 142 can communicate with one or more management components 104 of a client device 102 to obtain information related to the client device 102, such as hardware, operating systems, applications, location and time, and network usage information related to the client device 102. The management service 142 can also communicate with the network gateway 150 to obtain information related to network usage. Additionally, the management service 142 can communicate with the network carrier 130 to obtain information related to carrier accounts 132.

In some examples, the compliance rules 148 can specify one or more remedial actions that should be performed in an instance in which the conditions specified by the compliance rules 148 are not satisfied. The management service 142 can enforce the remedial actions in the event that a compliance rule 148 is violated. In some examples, a remedial action can include transmitting a notification to a user or administrator, which can include information describing the conditions of the compliance rule 148 and specify what condition caused the compliance rule 148 to be violated.

If the management service 142 identifies information that indicates that a condition of a compliance rule 148 is not satisfied, the management service 142 can perform one or more remedial actions. For instance, the management service 142 can disable access to the network 120 for the client device 102 or a particular client application 106, can notify the user or an administrator of the violation and include information related to the violation, can transmit information related to the violation to the management service 142, and can transmit a request to replenish the data allotment of a carrier account 132 to a network carrier 130 (e.g., through an API of the network carrier 130).

While the evaluation of compliance rules 148 and enforcement of compliance rules 148 has been described here as performed by the management service 142, the management component 104 can perform the same operations. The management component 104 can receive the compliance rules 148 from the management service 142, and can install them in storage accessible to the management component 104. The management component 104 can continuously evaluate compliance rules 148 as the management component 104 monitors the use of the client device 102, including network usage.

Figure 2A:
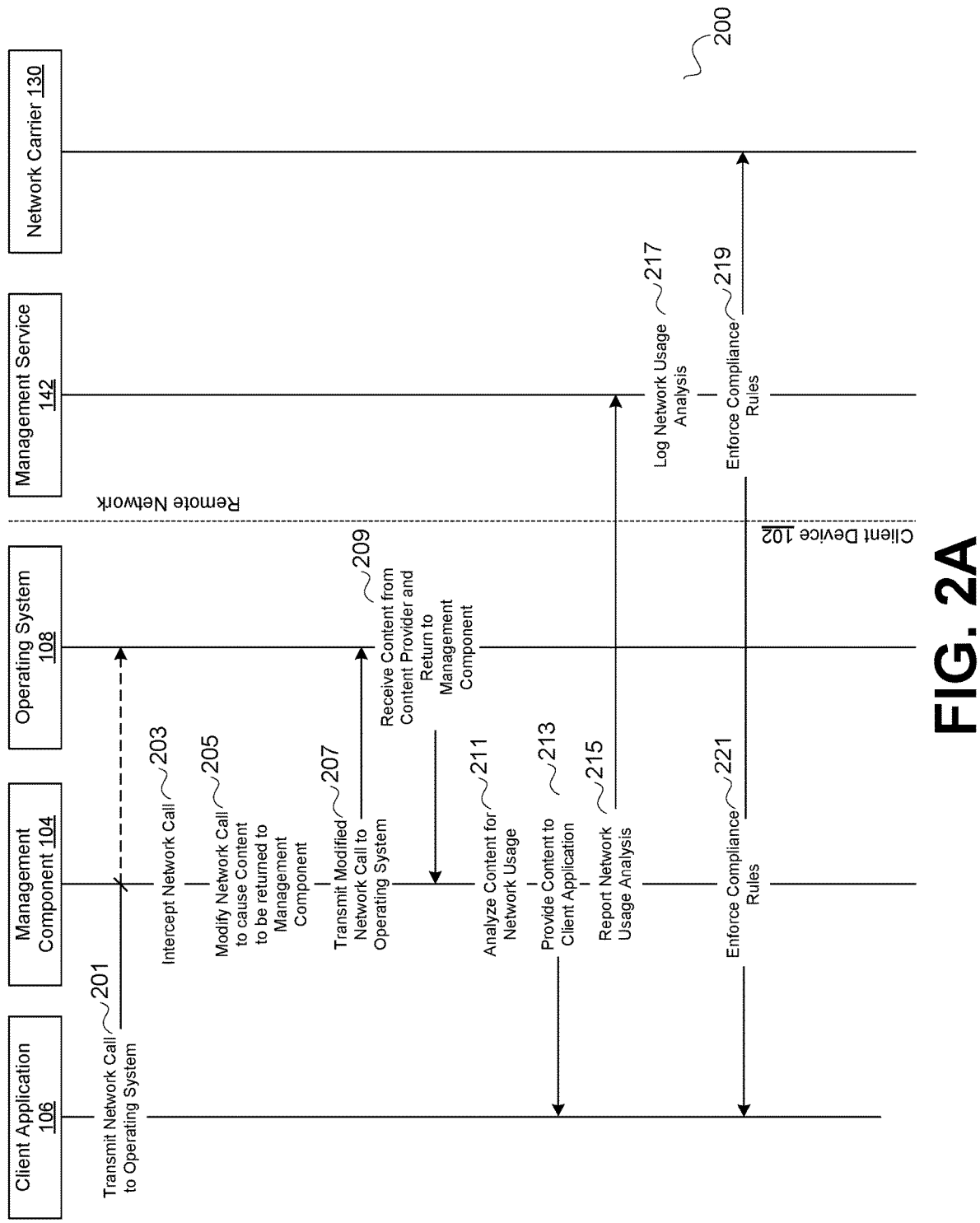
FIGS. 2A and 2B are sequence diagrams illustrating an example component interaction according to various examples of the present disclosure.

Turning now to FIG. 2A, shown is a sequence diagram 200 illustrating one example of interaction between the client application 106, the management component 104, the operating system 108, the management service 142, and the network carrier 130. Functionality attributed to each of the client application 106, the management component 104, the operating system 108, the management service 142, and the network carrier 130 can be implemented in a single process or application or in multiple processes or applications. The separation or segmentation of functionality is presented for illustrative purposes only.

Beginning with step 201, the client application 106 can transmit a network call to the operating system 108 that causes the operating system 108 to establish a communication channel with a content provider 160. In some examples, the client application 106 can transmit the network call in response to a user input to a user interface 114 provided by the client application 106, where the user input requests that the client application 106 receive (or access) content 162 from the content provider 160.

Next, in step 203, the management component 104 can intercept the network call. In some examples, the management component 104 can analyze all method calls transmitted from the client application 106 to the operating system 108, and can intercept network calls that cause the operating system 108 to receive content 162 from content providers 160. For example, the management component 104 can intercept network calls belonging to particular classes or APIs, such as the NSURLSession or NSURLConnection Objective-C classes that are transmitted to an Apple iOS® operating system.

Then, in step 205, the management component 104 can modify the intercepted network call. In some examples, the network call transmitted by the client application 106 to the operating system 108 specifies that the content 162 received by the operating system 108 from the content provider 160 should be returned to the client application 106. The management component 104 can first receive the content by changing a source parameter of the network call from the client application 106 to the management component 104. This, in turn, can cause the operating system 108 to return the content 162 to the management component 104, which is interpreted to be the source of the network call requesting the content 162. Alternatively, the management component 104 acts as a local gateway that intercepts all traffic to the client application 106 before the client application obtains the traffic.

Next, in step 207, the management component 104 can transmit the modified network call to the operating system 108.

Then, in step 209, the operating system 108 can, in response to receiving the modified network call from the management component 104, return the content 162 to the management component 104. In some examples, the operating system 108 establish a communication channel with the content provider 160 over the network 120 through which the operating system 108 can receive the content 162 from the content provider 160. Once the content 162 is received by the operating system 108, the operating system 108 can return the content 162 to the management component 104.

Next, in step 211, the management component 104 can, in response to receiving the content 162 from the content provider 160, analyze the content 162 for network usage and create a network usage analysis describing the network usage. In some examples, as described herein, the management component 104 can analyze the content 162 for network usage by analyzing the header of each data packet comprising the content 162 to identify a byte count associated with each data packet, and can sum the byte counts of the data packets comprising the content 162 to determine the amount of bytes sent over the network 120 to receive the content 162 from the content provider 160. Also, as described herein, the management component 104 can create a network usage analysis that includes one or more of the following properties describing the network usage: a client device ID, an application ID, a personal use indicator, an enterprise use indicator, a content provider ID, a content ID, a content type, a session duration, a bytes received quantity, a packets received quantity, a bytes transmitted quantity, a packets transmitted quantity, a network carrier ID, a cellular network indicator, a Wi-Fi network indicator, a roaming indicator, a MCC, or a MNC.

Then, in step 213, the management component 104 can provide the content 162 to the client application 106. In some examples, the management component 104 can transmit the content 162 to the client application 106 using a secure inter-process communication protocol. In other examples, the management component 104 can release certain access controls over the content 162, causing the content 162 to be accessible to the client application 106. In one example, the client application 106 is containerized or "wrapped" by the management component 104, which can be performed using an SDK. The management component 104 can encrypt data upon the receipt of each packet or frame. Once all packets for a given transmission are received and used in network accounting, the management component 104 can provide the encrypted data to the client application 106, which can then decrypt the packets for use. In another example, once all packets for a given transmission are received and used in network accounting, the management component 104 can decrypt the data and provide the data to the client application 106 for use.

Next, in step 215, the management component 104 can report the network usage analysis to the management service 142. In some examples, the management component 104 can establish a secure communication channel with the management service 142 through which the management component 104 can transmit the network usage analysis to the management service 142.

Then, in step 217, the management service 142 can log the network usage analysis. In some examples, the management service 142 can identify one or more management accounts 146 associated with the network usage analysis, such as a user-specific management account, a device-specific management account, or a carrier account-specific management account, and add the network usage analysis to each. Additionally, the management service 142 can add the network usage analysis to a table of aggregated network usage analyses, where each network usage analysis line item describing an instance of network usage.

Further, in step 219, the management component 104 or the management service 142 can enforce compliance rules 148 that are violated. In some examples, compliance rules 148 can specify one or more remedial actions that should be performed if the conditions of the compliance rules 148 are not satisfied. The management component 104 or management service 142 can determine whether any remedial actions should be performed based on whether any information describing the network usage, such as that contained in the network usage analysis, indicates that the conditions of the compliance rules 148 are not satisfied. Additionally, the management component 104 or management service 142 can determine whether any remedial actions should be performed based on whether any information describing one or more associated management accounts 146, such as information within an aggregate table of network usage analyses, indicates that the conditions of the compliance rules 148 are not satisfied.

If the compliance rules 148 are not satisfied, the management component 104 or management service 142 can cause one or more of the following remedial actions to be performed: cause a notification describing the violation of the compliance rule 148 to be transmitted to a user the or administrator of an associated management account 146, cause a network interface of a client device 102 to be disabled, cause a particular client application 106 to be disabled, cause a network interface of a client device 102 to be inaccessible to a particular client application 106, cause a client device 102 to be disabled, or cause a request to replenish a data allotment of a carrier account to be transmitted to the network carrier 130.

Figure 2B:
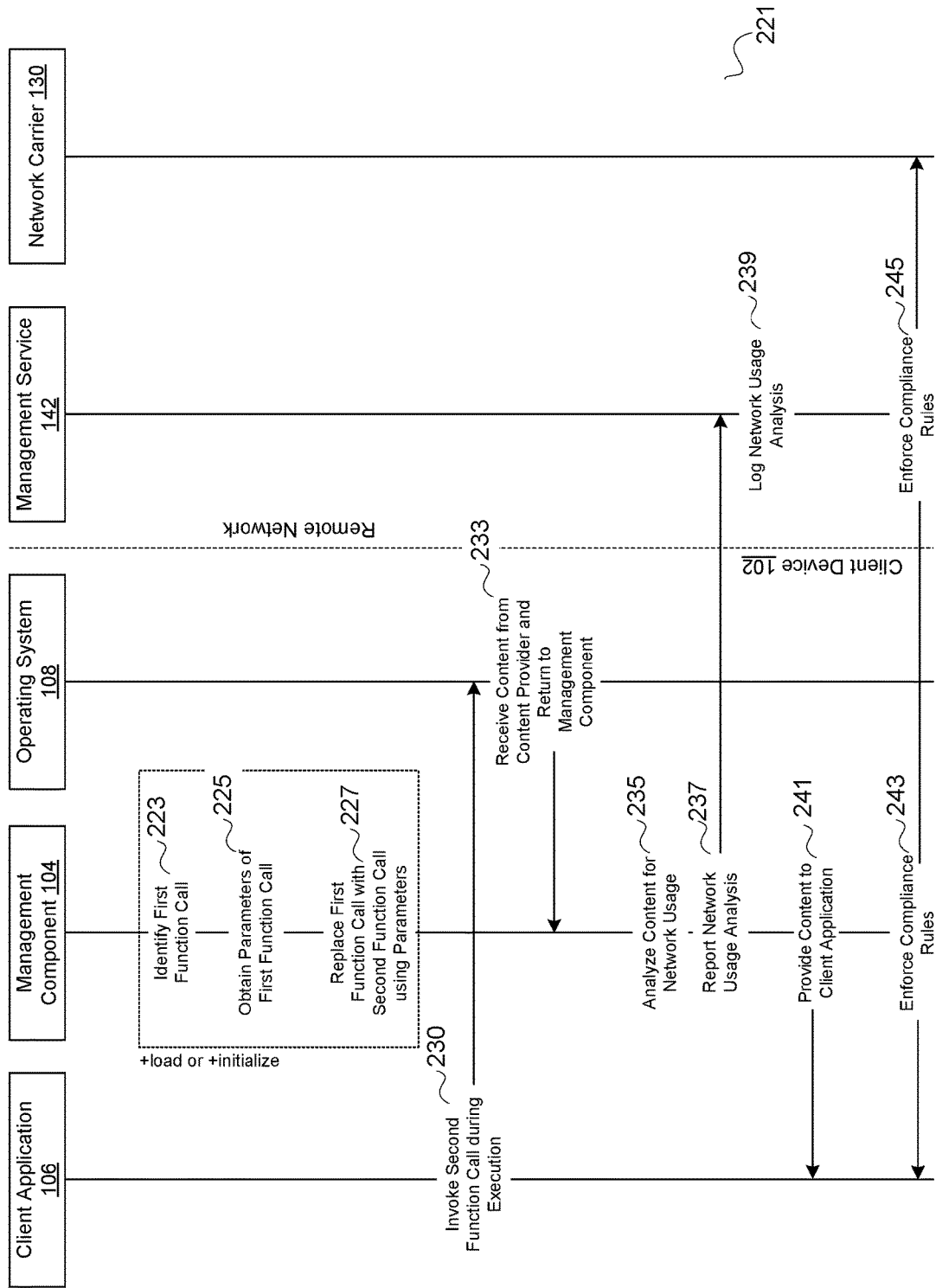

Referring next to FIG. 2B, shown is a sequence diagram 221 illustrating another example of interaction between the client application 106, the management component 104, the operating system 108, the management service 142, and the network carrier 130. Functionality attributed to each of the client application 106, the management component 104, and the operating system 108 can be implemented in a single process or application or in multiple processes or applications. Similarly, functionality attributed to each of the management service 142 and the network carrier 130 can be implemented in a single process or application or in multiple processes or applications. The separation or segmentation of functionality as discussed herein is presented for illustrative purposes only.

In some examples, the management component 104 can include a library of classes, functions, variables, methods, or other data types made accessible to routines in the client application 106 using an application programming interface (API). In one example, a developer a client application 106 can use an SDK to develop the client application 106 in one or more programming languages. The SDK can include the library in the client application 106 before the source code of the client application 106 is compiled into object code or binary code executable by the client device 102. Using the API of the library, the developer can directly interface with components of the library, or, in some examples, the library can alter the source code of the client application 106 at compile-time or the object code of the client application 106 at runtime to perform network usage management.

For example, a developer can utilize an SDK to develop the client application 106 for the Apple iOS® operating system 108 by writing source code in the Objective-C or Swift programming languages. In one example, a third-party service can provide the management component 104 as a collection of one or more libraries for developers to include in the source code of the client application 106 which enables the third-party service to analyze network usage for the client application 106.

For client applications 106 developed for the Apple iOS® operating system 108, the operating system 108 can enable the management component 104 to perform various functions when a client application 106 is loaded. For example, the +load class is automatically invoked whenever a class or category is added to the Objective-C runtime. The management component 104 can include code that performs functions in the +load method in response to a loading of the client application 106 or in the +initialize method, which is automatically invoked a class before it receives a first message. The functions can include replacing a first function call with a second function call. In examples where the management component 104 includes one or more libraries, the one or more libraries can perform various functions through the +load or +initialize class.

For example, a developer can cause a client application 106 to download or otherwise access content over the network 120 by making calls to the NSURLSession or NSURLConnection Objective-C classes in the source code of the client application 106, where the NSURLSession class can be invoked by a client application 106 to download content and the NSURLConnection can be invoked by a client application 106 to load contents retrieved from a specified uniform resource locator (URL). During the +load method, the management component 104 can replace all calls made to the NSURLSession or NSURLConnection with calls to other functions that are able identify to the size of the content being retrieved before invoking the actual NSURLSession and NSURLConnection calls. As a result, the developer is not required to develop any additional code to manage network usage by the client application 106.

The replacement of the NSURLSession, NSURLConnection, or other function call, can be performed by a process referred to as "swizzling" where an implementation of an existing selector is changed during the +load method as invocations in some programming languages, such as Objective-C, can be changed at runtime or prior to runtime. Swizzling can include changing how selectors are mapped to functions in a dispatch table for a given class.

Hence, through the +load or +initialize class, the management component 104 can perform various operations at runtime or before a class receives its first message, respectively. Beginning with step 223, the management component 104 can identify a first function call, such as a network call that directly or indirectly causes content to be sent or received over the network 120.

In step 225, the management component 104 can obtain the parameters of the first function call, such as the function parameters used when invoking the first function call.

In step 227, the instance of the first function call is replaced with a second function call through swizzling or similar method. In some examples, the second function call includes a function defined by the management component 104 that analyzes content being sent or received through the first function call to determine network usage for the client application 106. For example, if the first function call is invoked during execution of the client application 106 to access a 5 GB video file over the network, then the second function call can identify the size of the video file as 5 GB and can log the client application 106 as having used 5 GB of network usage. The second function call can include the parameters obtained from the first function call, as can be appreciated, and thus case the operations of the first function call to be performed as well as the additional functions defined by the second function call.

During execution, at step 230, the client application 106 invokes the second function call that has replaced the first function call. In some examples, the client application 106 can invoke the second function call in response to a user input to a user interface 114 provided by the client application 106, where the user input requests that the client application 106 receive content 162 from the content provider 160. In some examples, the second function invoked by the client application 106 can include a call to the operating system 108 to send or receive content over the network 120.

Hence, at step 233, the operating system 108 can receive the content 162 from the content provider 160 to return to the client application 106.

The content 162 received by the operating system 108 from the content provider 160 can be returned to the management component 104. In one example, the content 162 can be handled programmatically by the function or routine called by the second function call. Next, in step 235, the management component 104 can, in response to receiving the content 162 from the content provider 160, analyze the content 162 for network usage and create a network usage analysis describing the network usage. In some examples, the management component 104 can analyze the content 162 for network usage by analyzing the header of each data packet comprising the content 162 to identify a byte count associated with each data packet, and can sum the byte counts of the data packets comprising the content 162 to determine the amount of bytes sent over the network 120 to receive the content 162 from the content provider 160. In other examples, a function capable of determining a size of a data object can be invoked, such as sizeof( ) or malloc_size( ) to analyze the content 162 for network usage.

Then, in step 233, the management component 104 can provide the content 162 to the client application 106. In some examples, the management component 104 can transmit the content 162 to the client application 106 using a secure inter-process communication protocol. In other examples, the management component 104 can release certain access controls over the content 162 (e.g., decrypting received network data), causing the content 162 to be accessible to the client application 106. In another example, the management component 104 can perform a call to the function or routine associated with the first function call, where the content is provided as a parameter of the first function call.

Next, in step 235, the management component 104 can analyze the network usage and create a network usage analysis.

In step 237, the management component 104 can report the network usage analysis to the management service 142.

Then, in step 239, the management service 142 can log the network usage analysis. In some examples, the management service 142 can identify one or more management accounts 146 associated with the network usage analysis, such as a user-specific management account, a device-specific management account, and a carrier account-specific management account, that are stored by the management service 142, and can add the network usage analysis to each. Additionally, the management service 142 can add the network usage analysis to a table of aggregated network usage analyses, where each network usage analysis line item describing an instance of network usage.

In step 241, the content 162 can be provided to the client application 106. In some examples, the first function associated with the first function call can be invoked to provide the content 162 as intended by the developer of the client application 106.

Further, in step 243 and step 245, the management component 104 or the management service 142 can enforce compliance rules 148 that are violated. In some examples, compliance rules 148 can specify one or more remedial actions that should be performed if the conditions of the compliance rules 148 are not satisfied. The management component 104 or the management service 142 can determine whether any remedial actions should be performed based on whether any information describing the network usage, such as that contained in the network usage analysis, indicates that the conditions of the compliance rules 148 are not satisfied. Additionally, the management component 104 or management service 142 can determine whether any remedial actions should be performed based on whether any information describing one or more associated management accounts 146, such as information within an aggregate table of network usage analyses, indicates that the conditions of the compliance rules 148 are not satisfied.

Turning now to FIG. 2C, shown is example pseudocode to implemented in the management component 104 that can be used to replace function calls made by a developer of the client application 106. In the example of FIG. 2C, selector replacement is performed to replace a function call with another. Referring to code block 248, a first selector ("oldSelector") can be defined as the selector to be replaced. For example, a second selector ("newSelector") can be used to replace the first selector at compile-time or at runtime of the client application 106. By doing so, any function calls made to "exampleFunction" will be replaced with a function call to "mod exampleFunction," which, in some examples, can include a modified form of the first function ("exampleFunction").

Code block 252 can call an operating system function or a library function capable of replacing the calls made to the first function ("exampleFunction") with calls to the second function ("mod exampleFunction"). Code block 255 shows an example definition of the second function "mod exampleFunction," which can be defined in the management component 104. In one example, the second function can analyze network usage of the first function by identifying the size of any data received or sent as a result of the first function call, as shown in code block 258. The size of the data can be sent to the management service 142 to create a network usage analysis. Prior to completion of the routine, the second function can include a call to the first function ("exampleFunction") after the network usage has been evaluated. By calling the first function, the functionality intended by the developer of the client application 106 is maintained even though the function invoked by the developer has been replaced with another function. The replacement of a first function call with a second function call can be performed in the +load routine to accomplish the replacement at runtime, as shown in code block 262.

The function calls to be replaced can include NSURLSession, NSURLConnection, or other function call that causes the transmission or receipt of data over the network 120. In one example, the call to NSURLSession is replaced with a function call to mod NSURLSession that analyzes data received by the client device 102 over the network 120.

After the data received by the client device 102 is analyzed to determine the size of the data, log the size of the data, and communicate the size of the data to a remote computing service, such as the management service 142, the NSURLSession function can be called to perform the intended functionality defined by the developer of the client application 106.

In examples in which the client application 106 includes a media player application, functions that cause transmission or receipt of data over the network 120 can also be replaced with functions that identify the amount of network usage. For media player applications, the function calls to be replaced can include initWithUrl, initWithPlayerItem, replaceCurrentItemWithPlayerItem, or other function call that causes the transmission or receipt of data over the network 120 during playback of media content.

Figure 3:
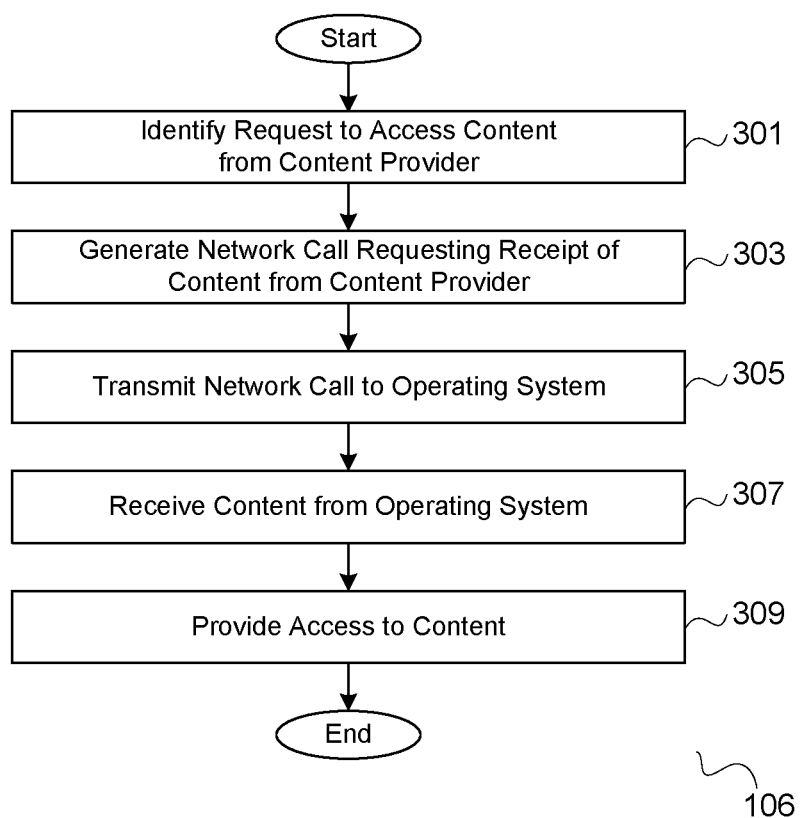
FIGS. 3-11 are flowcharts illustrating examples of functionality according to various examples of the present disclosure.

Turning now to FIG. 3, shown is a flowchart that provides an example of a portion of the operation of a client application 106. In particular, FIG. 3 provides an example of a client application 106 requesting that the operating system 108 of the client device 102 receive content 162 from a content provider 160 on its behalf. The flowchart of FIG. 3 can be viewed as depicting an example of a method implemented in the client device 102.

Beginning with step 301, the client application 106 can identify a request to access content 162 from a content provider 160. In some examples, the client application 106 can identify a user input that requests access to content 162 provided by a content provider 160, which is accessible to the client application 106 over a network 120.

Then, in step 303, the client application 106 can generate a network call that, when transmitted to the operating system 108, can cause the operating system 108 to receive the content 162 from the content provider 160 over the network 120. The network call can, for instance, be a method call within either of the NSURLSession or NSURLConnection Objective-C classes, which when transmitted to an Apple iOS® operating system 108 cause the operating system 108 to invoke a network interface of the client device 102 to perform network operations, such as requesting and receiving content 162 from a content provider 160 over the network 120. In some examples, the client application 106 can configure a source parameter of the network call, causing the source parameter to reference the client application 106 as the source of the network call. Additionally, the client application 106 can configure a content parameter of the network call, causing the content parameter to reference the content 162, such as a file name, that the client application 106 wishes to access. Furthermore, the client application 106 can configure a content provider parameter, causing the content provider parameter to reference the content provider 160, such as a URL for the content provider 160, from which the client application 106 wishes to access the content 162.

Next, in step 305, the client application 106 can transmit the network call to the operating system 108.

Then, in step 307, the client application 106 can receive the content 162. In some examples, the client application 106 can receive the content 162 from a management component 104. In other examples, the client application 106 can receive the content 162 from the operating system 108 of the client device 102.

Further, in step 309, the client application 106 can provide access to the content 162. In some examples, the client application 106 can render the content 162 in a user interface 114 of the display 112 of the client device 102. Thereafter, the process can proceed to completion.

Figure 4:
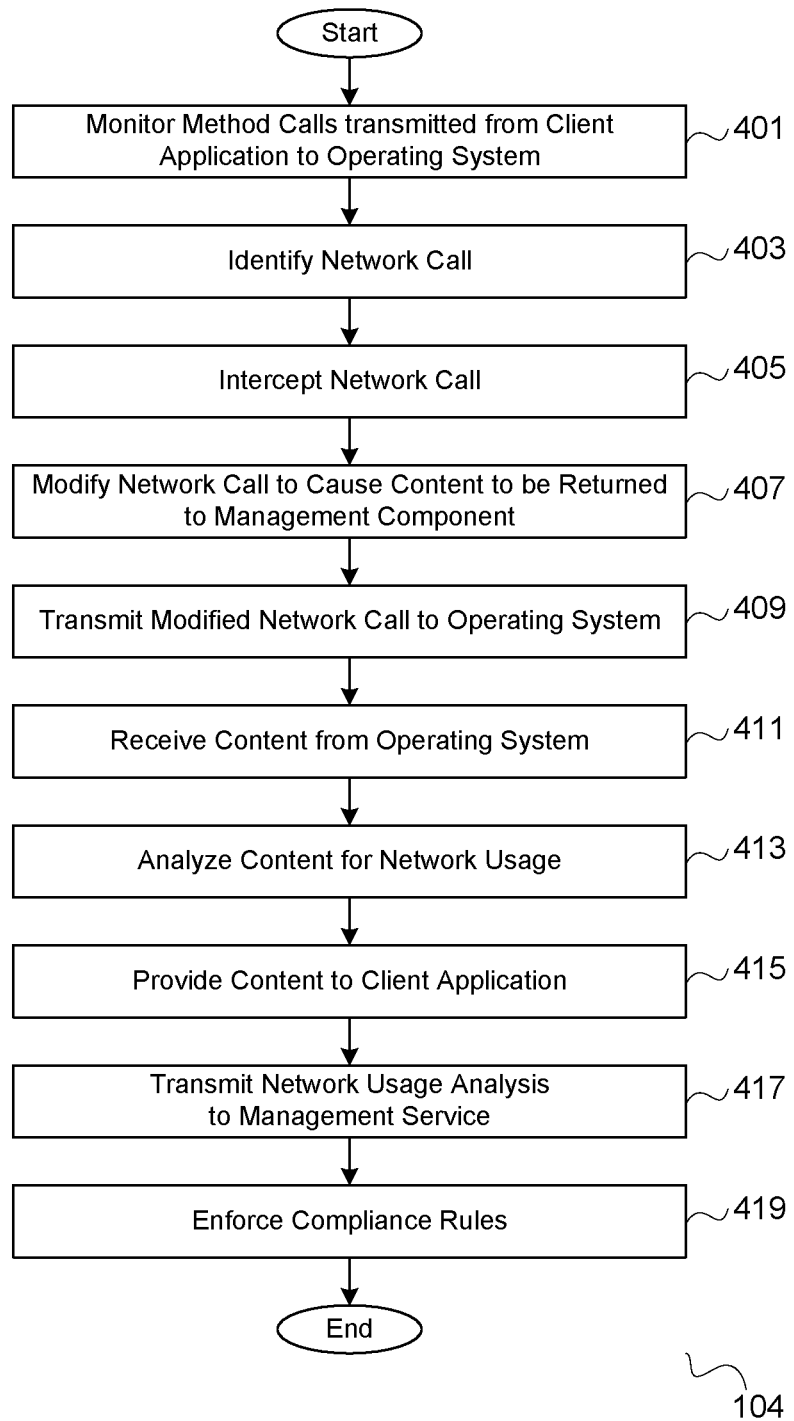

Turning now to FIG. 4, shown is a flowchart that provides an example of a portion of the operation of a management component 104. In particular, FIG. 4 provides an example of a management component 104 intercepting a network call, modifying the network call to cause content 162 to be returned to the management component 104, and analyzing the content 162 for network usage. The flowchart of FIG. 4 can be viewed as depicting an example of a method implemented in the client device 102.

Beginning with step 401, the management component 104 can monitor method calls transmitted from a client application 106 to an operating system 108 of a client device 102.

Then, in step 403, the management component 104 can identify a network call (amongst the monitored method calls transmitted from the client application 106 to the operating system 108). In some examples, the network call can cause the operating system 108 of the client device 102 to request and receive content 162 from a content provider 160 on behalf of the client application 106. For instance, the network call can be a method call within either of the NSURLSession or NSURLConnection Objective-C classes, which can cause an Apple iOS® operating system 108 to receive content 162 from a content provider 160 over the network 120.

Next, in step 405, the management component 104 can intercept the network call. That is, the management component 104 can prevent the network call from reaching the operating system 108.

Then, in step 407, the management component 104 can modify the network call to cause the content 162 requested to be returned to the management component 104, rather than to the client application 106. This may not be applicable in situations in which the management component 104 is included as a library of the client application 106 or the management component 104 and the client application 106 are included within a same sandbox. In some examples, the management component 104 can modify the network call by changing a source parameter of the network call from a reference to the client application 106 to a reference to the management component 104. This, in turn, can cause the operating system 108 to return the content 162 to the management component 104.

In one example, the management component 104 encrypts (or instructs the operating system 108 to encrypt) content received over the network 120 until the usage analysis is performed. This effectively prevents the client application 106, or its routines, from accessing the content until decryption. In one example, the management component 104 or the operating system 108 encrypts a data packet as it is received. Once the size of the data packet is measured and used in a usage analysis, the data packet is decrypted and assembled for use by the client application 106. In another example, one or more data packets are encrypted prior to transmission and receipt by the management component 104. When received by the management component 104, a usage analysis is performed on the encrypted packet using a predefined factor to account for cipher text size. By accounting for the cipher text size, the actual size of the underlying data is measured, as opposed to the size of the encrypted packet.

Next, in step 409, the management component 104 can transmit the modified network call to the operating system 108 of the client device 102.

Then, in step 411, the management component 104 can receive the content 162 requested by the network call from the operating system 108 of the client device 102. The management component can also store the content 162 in a data store that is inaccessible to the client application 106.

Next, in step 413, the management component 104 can analyze the content 162 for network usage, and can create a network usage analysis. As described herein, the management component 104 can populate the network usage analysis with information describing one or more of: the network usage, the content 162, the user, the client device 102, or the carrier account 132 used to access the content 162. Additionally, as described herein, the management component 104 can source the information from one or more of: the data packets comprising the content 162, the operating system 108, the management service 142, the network gateway 150, or the network carrier 130.

Then, in step 415, the management component 104 can provide the content 162 to the client application 106. In some examples, the management component 104 can transmit the content 162 to the client application 106 through a secure inter-process communication protocol. In other examples, the management component 104 can release one or more access controls over the content 162 to permit the client application 106 to access the content 162, such as decrypting the content 162 or instructing the operating system 108 to grant the client application 106 permission to access the storage location of the content 162.

Next, in step 417, the management component 104 can transmit the network usage analysis to the management service 142. In some examples, the management component 104 can cause the operating system 108 to establish a secure communication channel between the management component 104 and the management service 142 through which the management component 104 can transmit the network usage analysis to the management service 142.

Then, in step 419, the management component 104 can enforce any compliance rules 148 that are violated based at least in part on the network usage. The management component 104 can, for instance, determine whether any compliance rules 148 are violated based on information describing network usage, and if so, can enforce one or more remedial actions specified by the violated compliance rules 148. Thereafter, the process can proceed to completion.

Figure 5:
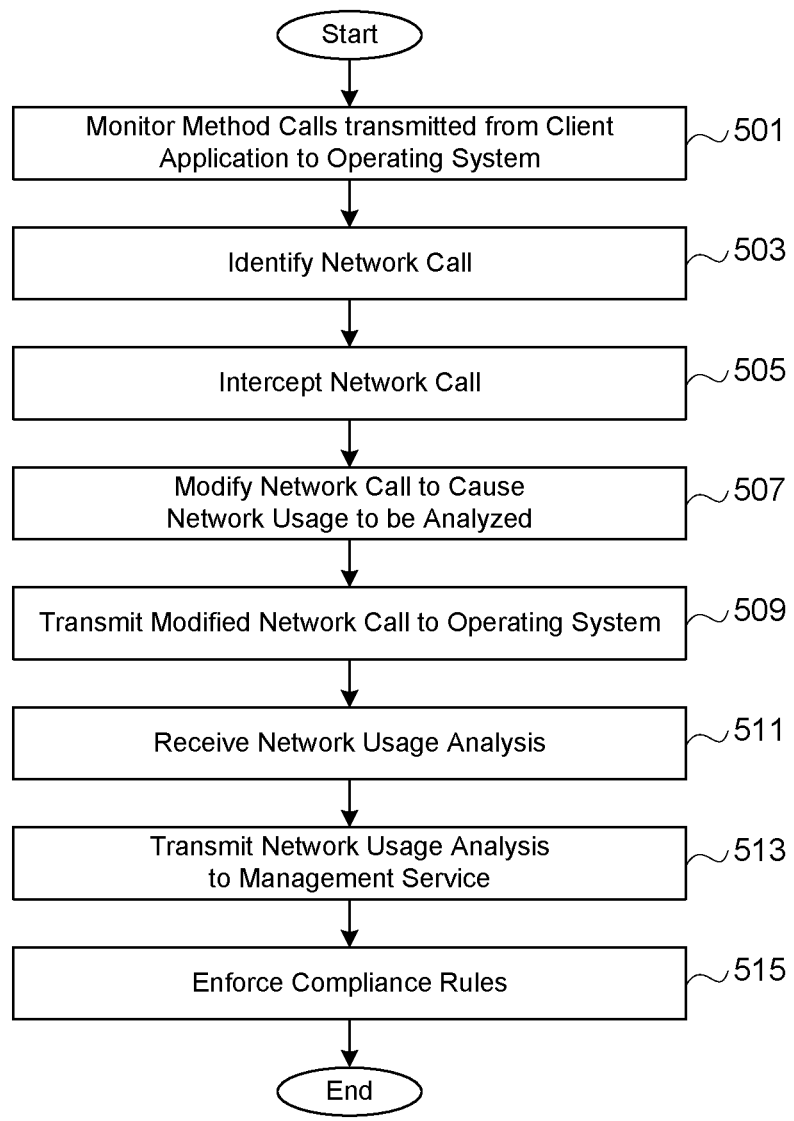

Turning now to FIG. 5, shown is a flowchart that provides an example of a portion of the operation of a management component 104. FIG. 5 provides an example of an alternative implementation of the process described in FIG. 4. In particular, FIG. 5 provides an example of a management component 104 intercepting a network call, modifying the network call to cause content 162 to be analyzed for network usage, and transmitting the modified network call to the operating system 108 of the client device 102. The flowchart of FIG. 5 can be viewed as depicting an example of a method implemented in the client device 102.

Beginning with step 501, the management component 104 can monitor method calls transmitted from a client application 106 to an operating system 108 of a client device 102.

Then, in step 503, the management component 104 can identify a network call (amongst the monitored method calls transmitted from the client application 106 to the operating system 108). In some examples, the network call can cause the operating system 108 of the client device 102 to request and receive content 162 from a content provider 160 on behalf of the client application 106. For instance, the network call can be a method call within either of the NSURLSession or NSURLConnection Objective-C classes, which can cause an Apple iOS® operating system 108 to receive content 162 from a content provider 160 over the network 120.

Next, in step 505, the management component 104 can intercept the network call. That is, the management component 104 can prevent the network call from reaching the operating system 108.

Then, in step 507, the management component 104 can modify the network call to cause the content 162 to be analyzed for network usage. That is, in addition to the network call causing content 162 to be received from a content provider 160 over the network, the network call can cause the content 162 to be analyzed for network usage. In some examples, the network call can be imbedded with logic or instructions that cause the content 162 to be analyzed for network usage when executed by a processor of the client device 102. In one example, the network call can cause the operating system 108 to analyze the content 162 for network usage before the operating system 108 returns the content 162 to the client application 106. In another example, the network call can cause the operating system 108 to pass the instructions causing the content 162 to be analyzed to the client application 106 (along with the content 162), and the client application 106 can analyze the content 162 for network usage.

Next, in step 509, the management component 104 can transmit the modified network call to the operating system 108 of the client device 102.

Then, in step 511, the management component 104 can receive a network usage analysis describing the network usage related to the receipt of the content 162 over the network 120. In some examples, the management component 104 can receive the network usage analysis from the operating system 108 of the client device 102. In other examples, the management component 104 can receive the network usage analysis from the client application 106. In any case, the management component 104 can store the network usage analysis in a data store accessible to the management component 104.

Next, in step 513, the management component 104 can transmit the network usage analysis to the management service 142. In some examples, the management component 104 can cause the operating system 108 to establish a secure communication channel between the management component 104 and the management service 142 through which the management component 104 can transmit the network usage analysis to the management service 142.

Then, in step 515, the management component 104 can enforce any compliance rules 148 that are violated based at least in part on the network usage. The management component 104 can, for instance, determine whether any compliance rules 148 are violated based on information describing network usage, and if so, can enforce one or more remedial actions specified by the violated compliance rules 148. Thereafter, the process can proceed to completion.

Figure 6:
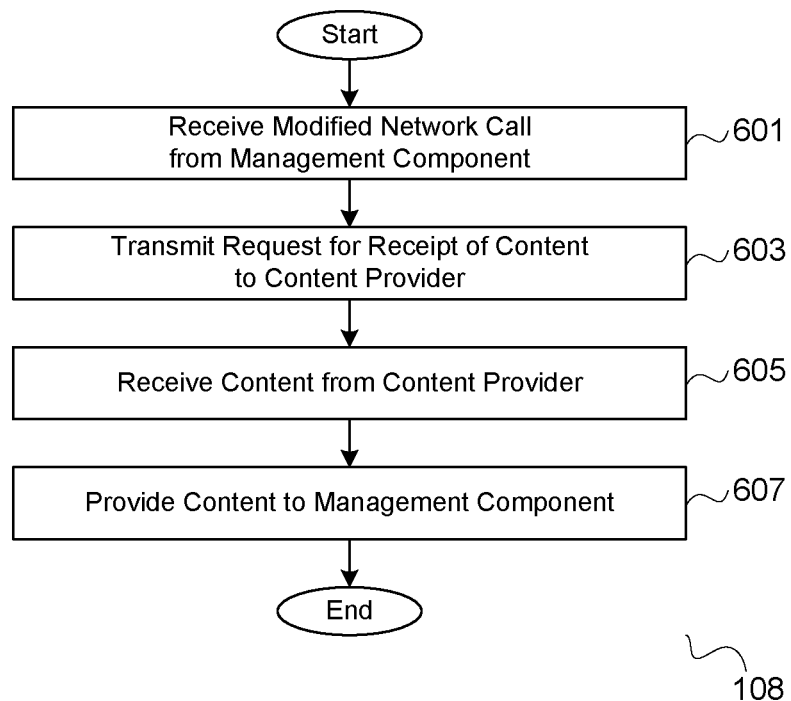

Turning now to FIG. 6, shown is a flowchart that provides an example of a portion of the operation of an operating system 108 of a client device 102. In particular, FIG. 6 provides an example of an operating system 108 receiving a modified network call, transmitting a request to receive content 162 from a content provider 160, receiving the content 162 from the content provider 160, and returns the content 162 to the source of the modified network call. The flowchart of FIG. 6 can be viewed as depicting an example of a method implemented in the client device 102.

Beginning with step 601, the operating system 108 can receive a modified network call from a management component 104. In some examples, the modified network call can be configured to cause the operating system 108 to request content 162 from a content provider 160 over the network 120, receive the content 162, and return the content 162 to the source of the modified network call.

Then, in step 603, the operating system 108 can transmit a request to receive content 162 to a content provider 160. In some examples, the operating system 108 can invoke a network interface of the client device 102 to cause the network interface to establish a communication channel with the content provider 160, through which the operating system 108 can transmit the request to receive content 162 to the content provider 160.

Next, in step 605, the operating system 108 can receive the content 162 from the content provider 160. In some examples, the operating system 108 can invoke a network interface of the client device 102 to cause the network interface to establish a communication channel with the content provider 160, through which the operating system 108 can receive the content 162 from the content provider 160. The operating system 108 can also store the content 162 in storage accessible to the operating system 108.

Further, in step 607, the operating system 108 can provide the content 162 to the management component 104. In some examples, the operating system 108 can transmit the content 162 to the management component 104 using a secure inter-process communication protocol. In other examples, the operating system 108 can provide the management component 104 with privilege to access a storage space where the content 162 is stored. In yet other examples, the operating system 108 can decrypt the content 162 to permit the management component 104 to decipher the content 162. Thereafter, the process can proceed to completion.

Figure 7:
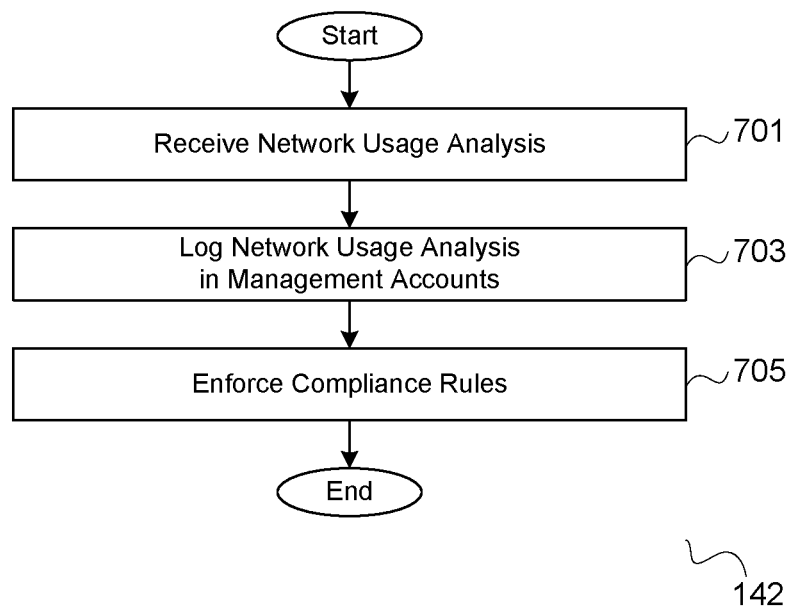

Turning now to FIG. 7, shown is a flowchart that provides an example of a portion of the operation of a management service 142. In particular, FIG. 7 provides an example of a management service 142 receiving a network usage analysis, logging the network usage analysis in one or more associated management accounts 146, and enforcing compliance rules 148 that are violated based at least in part on the network usage. The flowchart of FIG. 7 can be viewed as depicting an example of a method implemented in the management system 140.

Beginning with step 701, the management service 142 can receive a network usage analysis. In some examples, the network usage analysis can be received from a management component 104. In other examples, the network usage analysis can be received from an operating system 108 of a client device 102. In yet other examples, the network usage analysis can be received from a client application 106.

Then, in step 703, the management service 142 can log the network usage analysis in one or more management accounts 146 that are associated with the network usage analysis. For instance, the management service 142 can log the network usage analysis in a management account 146 associated with the client device 102 that consumed the network usage, management accounts 146 associated with users of the client device 102, and a management account 146 associated with a carrier account 132 used to access the network 120 during the network usage.

Further, in step 705, the management service 142 can enforce any compliance rules 148 that are violated based at least in part on the network usage. The management service 142 can, for instance, determine whether any compliance rules 148 are violated based on information describing network usage, and if so, can enforce one or more remedial actions specified by the violated compliance rules 148. Thereafter, the process can proceed to completion.

Figure 8:
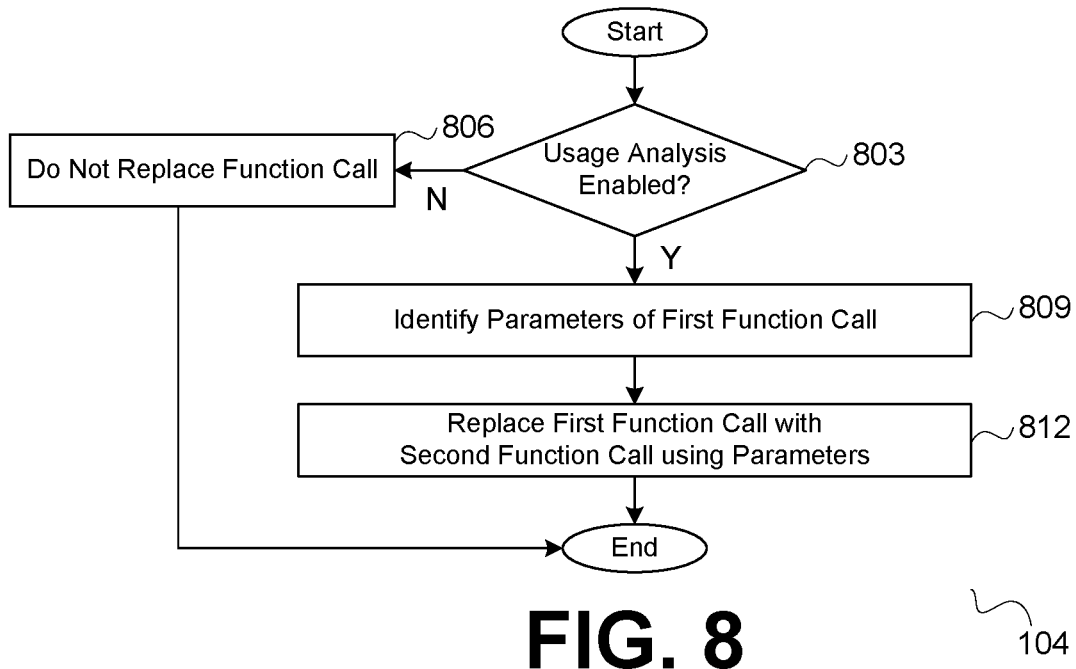

Moving on FIG. 8, shown is a flowchart that provides an example of a portion of the operation of a management component 104. In particular, FIG. 8 provides an example in which the management component 104 replaces a first function call set by a developer of the client application 106 with a second function call during a load routine, such as the +load routine in an Objective-C environment. The flowchart of FIG. 8 can be viewed as depicting an example of a method implemented in the client device 102.

Starting with step 803, the management component 104 can determine whether network usage analysis has been enabled. In one example, network usage analysis can be enabled by a developer of the client application 106 by defining or modifying a variable recognized by the management component 104. In another example, a user of the client device 102 can enable or disable network usage analysis. In yet another example, the management service 142 can remotely enable or disable network usage analysis at the request of an administrator or enterprise.

If network usage analysis is disabled, the process can proceed to step 806 where no function calls set by a developer are replaced. Thereafter, the process can proceed to completion.

On the contrary, if network usage analysis is enabled on the client device 102, the process can proceed to step 809 where parameters of the first function call can be identified. The parameters can include variables or other data types passed to the first function in the first function call. For example, in the following function, the parameters include "Parameter1" and "Parameter2":

varReturn=example_function_call(Parameter1, Parameter2).

Next, in step 812, the first function call is replaced with a second function call using the parameters identified in step 809. Referring to the above example, any instances of "example_function_call" can be replaced with a call to another function, such as "mod_example_function_call." The parameters identified in step 809 can be used in the second function call ("mod_example_function_call(Parameter1, Parameter2);") or otherwise passed to the second function, such as through a global variable or memory address. Thereafter, when the client application 106 is executed on the client device 102, the second function call is executed in place of the first function call. As the second function can include a call to the first function, the operation of the client application 106 will not change from what was defined by the developer.

Figure 9:
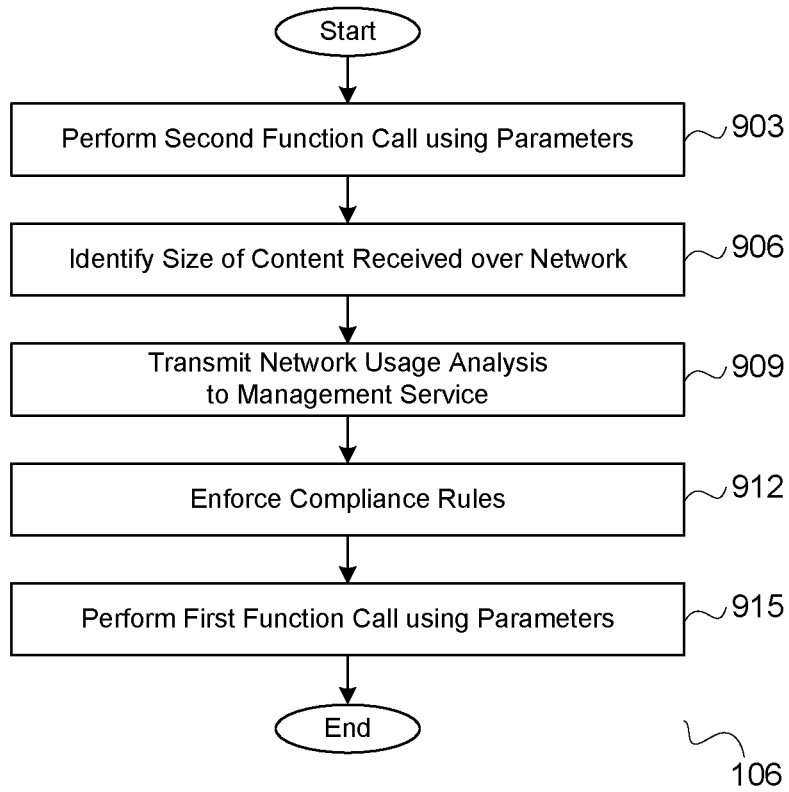

Referring next to FIG. 9, shown is a flowchart that provides an example of a portion of the operation of the client application 106 after the code of the client application 106 has been modified by the management component 104. In particular, FIG. 9 provides functionality that can be implemented programmatically through a replaced function. The flowchart of FIG. 9 can be viewed as depicting an example of a method implemented in the client device 102.

Starting at step 903, during execution of the client application 106, the second function call is performed using, for example, parameters identified from the first function call.

The second function, invoked by the second function call, can be configured to identify the size of content 162 received or transmitted over the network 120, as shown in step 906. Hence, the management component 104 can analyze the content 162 for network usage by analyzing the header of each data packet comprising the content 162 to identify a byte count associated with each data packet, and can sum the byte counts of the data packets comprising the content 162 to determine the amount of bytes sent over the network 120 to receive the content 162 from the content provider 160. In other examples, a function capable of determining a size of a data object can be invoked, such as sizeof( ) or malloc_size( ) to determine a size of the content 162 sent over the network 120.

In step 909, a network usage analysis can be communicated to the management service 142 over the network 120. The network usage analysis can include, for example, the functionality performed in the client device 102 that caused receipt or transmission of content 162, a size of the content 162, the client application 106 that caused receipt or transmission of the content 162, or the function of the client application 106 performed that caused receipt or transmission of the content 162. In further examples, the network usage analysis can include the amount of data required to send the usage analysis over the network 120.

Further, in step 912, the management service 142 can enforce any compliance rules 148 that are violated based at least in part on the network usage. The management component 104 can, for instance, determine whether any compliance rules 148 are violated based on information describing network usage, and if so, can enforce one or more remedial actions specified by the violated compliance rules 148.

In step 915, the first function call, replaced by the second function call, can be invoked such that the functionality intended by the developer of the client application 106 is maintained.

Figure 10:
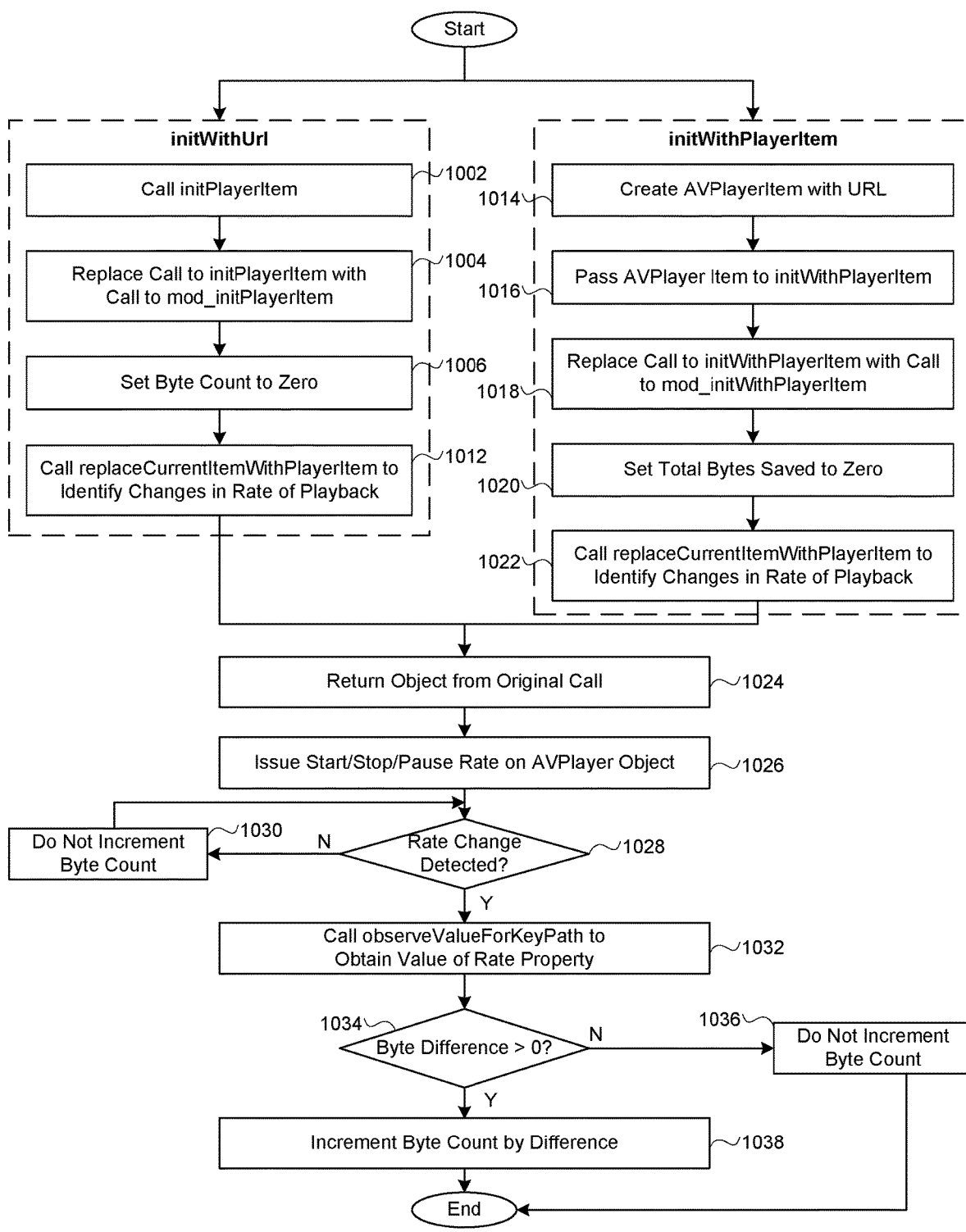

Referring next to FIG. 10, shown is a flowchart that provides an example of a portion of the operation of the client application 106 after the client application 106 has been modified by the management component 104. In particular, FIG. 10 provides an example of the management component 104 identifying function calls in the code of the client application 106 to an AVPlayer Objective-C class and implementing functionality to cause the content 162 received by the client device 102 to be analyzed for network usage. The flowchart of FIG. 10 can be viewed as depicting an example of a method implemented in the client device 102.

AVPlayer refers to a media player functions employed by the iOS® operating system. Using source code developed in Objective-C, Swift, or other suitable language, a developer can cause playback of certain media content 162 using functions of the operating system, namely by using the AVPlayer class. The media content 162 can refer to audio, video, a combination thereof, or other similar media items. As data usage cannot be tracked using header data with content 162 played on AVPlayer, a different approach to track data usage can be employed. In one example, a category that adds a method to the AVPlayer class can be created in which an observer is used monitor the rate property of an AVPlayer Item. The rate property, in some examples, can assume a number from 0 to 2. A rate of 0 indicates that the content 162 has been stopped or paused while a rate of 1 indicates that the content 162 is being played at a normal speed. A rate of 2 indicates that the content 162 is being played at twice its normal speed.

As such, the rate property can be used to identify at what rate content 162 is being consumed on the client device 102 using AVPlayer. The observer can be configured to listen for changes in the rate. Whenever change in the rate property is identified, a suitable method can be called that measures an amount of bytes transferred from the last byte measure (or the last change in the rate property).

To utilize AVPlayer on the client device 102, a developer of a client application 106 can create an instance of an AVPlayer data object using either the initWithUrl method or the initWithPlayerItem method. More specifically, a developer can use initWithUrl to cause AVPlayer to play a single audiovisual resource referenced by a URL. When initWithPlayerItem is invoked, AVPlayer plays a single audiovisual item, whether stored locally on the client device 102 or accessed remotely from a content provider 160. As a result, calls to either method requires specific handling by the management component 104 to measure network usage.

Referring first to instances where initWithURL have been detected in the code, in step 1002, the method initPlayerItem can be called initially to create an AVPlayer object using an URL.

Next, in step 1004, the call to initWithURL can be replaced with a predefined function, such as mod_initWithUrl or other predefined function. When the client application 106 executes, any instances to invoke initWithURL will instead invoke mod_initWithUrl.

Next, in step 1006, the byte count can be set to zero. The byte count can be incremented based on network usage caused by AVPlayer, as will be discussed.

Next, in step 1012, replaceCurrentItemWithPlayerItem can be called to identify any changes in the rate of playback of an object using AVPlayer. Calling replaceCurrentItemWithPlayerItem can be used to assign an observer to listen to changes in the rate of playback and adjust an AVPlayerItem property dynamically. The properties of the AVPlayer, such as rate, can be monitored using key-value observing.

Referring next to instances where initWithPlayerItem have been detected in the code, in step 1014, an AVPlayerItem can be created using a specified URL.

Next, the AVPlayerItem object can be passed to initWithPlayerItem, in step 1016.

In step 1018, the call to initWithPlayerItem can be replaced with a predefined function, such as mod_initWithPlayerItem or other predefined function. When the client application 106 executes, any instances to invoke initWithPlayerItem will instead invoke mod_initWithPlayerItem.

Next, in step 1020, the byte count can be set to zero. The byte count can be incremented based on network usage caused by AVPlayer, as will be discussed.

In step 1022, replaceCurrentItemWithPlayerItem can be called to identify any changes in the rate of playback of an object using AVPlayer. Calling replaceCurrentItemWithPlayerItem can be used to assign an observer to monitor properties of the AVPlayerItem, such as rate.

In step 1024, the AVPlayer object created from either step 1002 or step 1014 can be returned during execution to cause playback of a media object on the client device 102. As an observer has been created, any changes to the rate property during playback of the AVPlayer can be monitored. For example, if a user pauses playback on the client device 102, the rate property will change to 0.

In step 1026, a play, stop, pause, or resume rate can be issued on the AVPlayer object. For example, the rate property for the AVPlayer object can reset to 1.0 each time a user of the client device 102 causes the AVPlayer to start, stop, or pause.

In step 1028, the observer can detect that a change in the rate of playback has occurred through, for example, a task performed on the client device 102. The task can include, for example, a start, stop, pause, rewind, fast forward, speed up, slow down, or other similar action performed on the client device 102.

If no change in the rate property of the AVPlayer object is identified, the process can proceed to step 1030, where the byte count is not incremented. Thereafter, the process can return back to step 1028. While the observer can identify when a change in the rate of the AVPlayer object has occurred, it may not have access to the value of the rate property.

Hence, if a change in the rate property of the AVPlayer object is identified in step 1028, the process can proceed to step 1032 where the observeValueForKeyPath method can be called to identify the value of the rate property. In some examples, the rate property is a value between 0 and 2.

Thereafter, in step 1034, a determination is made whether the bytes received by the client device 102 when playing the content 162 is greater than zero. The observeValueForKeyPath method can be called to identify the difference in the number of bytes transferred since the last measurement was performed.

If the difference in bytes is not greater than zero, the process can proceed to step 1036 where the byte count is not incremented. Thereafter, the process can proceed to completion.

On the contrary, if the difference in bytes is greater than zero, the process can proceed to step 1038 where the byte count is incremented by the difference. As can be appreciated, the byte count can continue to be incremented until playback of the content 162 is terminated by the user of the client device 102 or AVPlayer. Thereafter, the process can proceed to completion.

Figure 11:
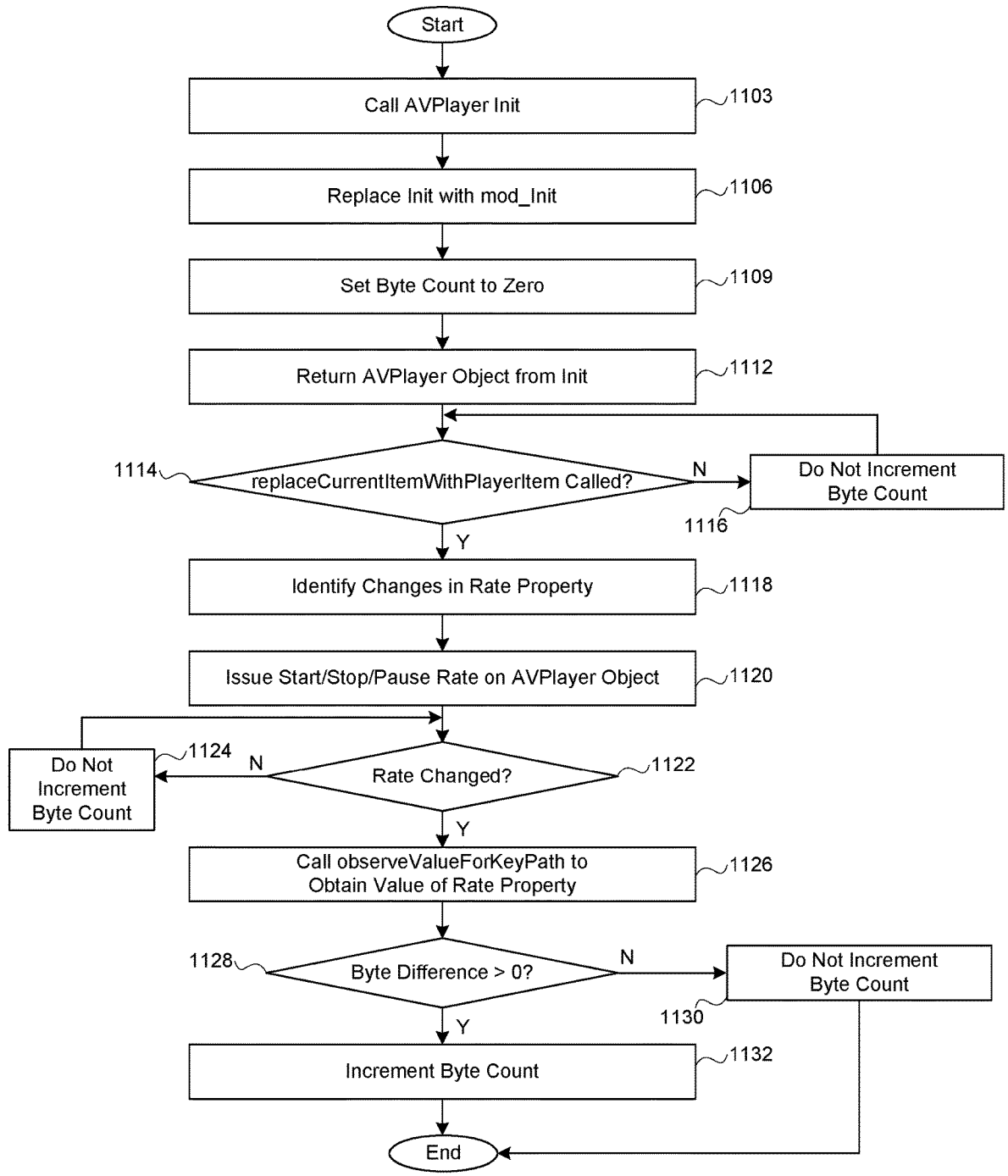

Referring next to FIG. 11, shown is a flowchart that provides an example of a portion of the operation of the client application 106 after the code of the client application 106 has been modified by the management component 104. In particular, FIG. 11 provides an example of the management component 104 identifying function calls in the code of the client application 106 to an AVPlayer Objective-C class and implementing functionality to cause the content 162 received by the client device 102 to be analyzed for network usage. The flowchart of FIG. 11 can be viewed as depicting an example of a method implemented in the client device 102.

In some instances, a developer can instantiate AVPlayer using the init method. However, when the init method is called, an AVPlayerItem object, used to obtain the rate property describing the rate of playback in AVPlayer, is not created. Additionally, when init is invoked for the AVPlayer class, the developer does not specify a URL or an AVPlayerItem object. Without either a URL or AVPlayerItem, an AVPlayerItem cannot be registered internally having null values. In some examples, the replaceCurrentItemWithPlayerItem method can be utilized to create an AVPlayerItem internal to a method to identify changes in the rate property during playback of content 162 using AVPlayer. Accordingly, when a developer uses the init method, the replaceCurrentItemWithPlayerItem can be called using an AVPlayerItem object as a parameter with a URL.

Starting with step 1103, the init method can be called to create an AVPlayer object.

Next, in step 1106, the call to the init method in the code of the client application 106 can be replaced with a predefined function, such as mod_init or other predefined function. When the client application 106 executes, any instances to invoke init will instead invoke mod_init.

In step 1109, the byte count can be set to zero. The byte count can be incremented based on network usage caused by AVPlayer, as will be discussed.

Next, in step 1114, a determination can be made of whether replaceCurrentItemWithPlayerItem has been called, which identifies changes in the rate property of the AVPlayerItem object.

If replaceCurrentItemWithPlayerItem has not been called, the process can proceed to step 1116 where the byte count is not incremented as there has not been a change in bytes received by the client device 102.

Thereafter, the process can return to step 1114. On the contrary, if replaceCurrentItemWithPlayerItem has been called, the replaceCurrentItemWithPlayItem assigns an observer to listen to changes in the rate property and create an AVPlayerItem property dynamically.

The process can then proceed to step 1120 where a start, stop, or pause rate can be issued on the AVPlayer object. For example, the rate property for the AVPlayer object can reset to 1.0 each time a user of the client device 102 causes the AVPlayer to start, stop, or pause.

In step 1122, the observer can determine whether a change in the rate property has occurred through, for example, a start, stop, pause, rewind, fast forward, speed up, slow down, or other similar action performed on the client device 102.

If no change in the rate property of the AVPlayerItem object is identified, the process can proceed to step 1124, where the byte count is not incremented. Thereafter, the process can return back to step 1122.

If a change in the rate property of the AVPlayerItem object is identified, the process can proceed to step 1126, where the observeValueForKeyPath method can be called to identify the value of the rate property. In some examples, the rate property is a value between 0 and 2.

Thereafter, in step 1128, a determination is made whether the bytes received by the client device 102 when playing the content 162 is greater than zero. The observeValueForKeyPath method can be called to identify the difference in the number of bytes transferred since the last measurement was performed.

If the difference in bytes is not greater than zero, the process can proceed to step 1130 where the byte count is not incremented. Thereafter, the process can proceed to completion.

On the contrary, if the difference in bytes is greater than zero, the process can proceed to step 1132 where the byte count is incremented by the difference. As can be appreciated, the byte count can continue to be incremented until playback of the content 162 is terminated by the user of the client device 102 or AVPlayer. Thereafter, the process can proceed to completion.

In further examples, whenever the rate property is modified, the observeValueForKeyPath:ofObject:change:context method can be called to identify the difference of the number of bytes transferred since the last transmission. This number of bytes can be recorded from a private AVPlayerItem item within a class. Further, whenever an AVPlayer is instantiated, the AVPlayerItem can be instantiated internally within the category regardless if a developer of the client application 106 uses the initWithURL or initWithAVPlayerItem method. To access the AVPlayerItem, the category can be imported and the properties accessed. In some examples, the category does not require importation into a development project for the client application 106 if access to the properties is not required and the function calls are replaced when the client application 106 is loaded.

The flowcharts of FIGS. 2-10 show examples of the functionality and operation of implementations of components described herein. The components of the networked environment 100 described herein can be embodied in hardware, software, or a combination of hardware and software. If embodied in software, each step in the flowcharts of FIGS. 2-10 can represent a module or a portion of code that includes computer instructions to implement the specified logical functions. The computer instructions can include source code that includes human-readable statements written in a programming language or machine code that includes machine instructions recognizable by a suitable execution system, such as a processor in a computer system. If embodied in hardware, each step can represent a circuit or a number of interconnected circuits that implement the specified logical functions.

Although the flowcharts show a specific order of execution, the order of execution can differ from that which is shown. For example, the order of execution of two or more steps can be switched relative to the order shown. Also, two or more steps shown in succession can be executed concurrently or with partial concurrence. Further, in some examples, one or more of the steps shown in the flowcharts can be skipped or omitted. In addition, any number of counters, state variables, warning semaphores, or messages can be added to the logical flow described herein, for purposes of enhanced utility, accounting, performance measurement, or troubleshooting aid.

The management system 140 and client device 102 described herein can include at least one processing circuit. The processing circuit can include one or more processors and one or more storage devices that are coupled to a local interface. The local interface can include a data bus with an accompanying address/control bus.

A storage device for a processing circuit can store data and components that are executable by the one or more processors of the processing circuit. In some examples, portions of the management service 142, the management accounts 146, and the compliance rules 148 can be stored in one or more storage devices and be executable by one or more processors. Also, the management component 104, client applications 106, and operating system 108 can be located in the one or more storage devices.

The management service 142, the management component 104, client applications 106, and operating system 108 can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, microprocessors, discrete logic circuits having logic gates for implementing various logic functions upon an application of one or more data signals, application specific integrated circuits (ASICs) having appropriate logic gates, or programmable logic devices, such as field-programmable gate array (FPGAs) and complex programmable logic devices (CPLDs).

Also, one or more or more of the components described herein that include software or computer instructions can be embodied in any non-transitory computer-readable medium for use by or in connection with an instruction execution system such as, for example, a processor in a computer system or other system. The computer-readable medium can contain, store, and maintain the software or computer instructions for use by or in connection with the instruction execution system.

A computer-readable medium can include a physical media, such as, magnetic, optical, semiconductor, or other suitable media. Examples of a suitable computer-readable media include solid-state drives, magnetic drives, flash memory, and storage discs, such as compact discs (CDs). Further, any logic or component described herein can be implemented and structured in a variety of ways. For example, one or more components described can be implemented as modules or components of a single application. Further, one or more components described herein can be executed in one computing device or by using multiple computing devices.

The examples described above are merely examples of implementations to set forth for a clear understanding of the principles of the disclosure. Many variations and modifications can be made to the examples described above without departing substantially from the spirit and principles of the disclosure. All like modifications and variations are intended to be included herein within the scope of this disclosure.

The invention claimed is:

1. A non-transitory computer-readable medium for identifying network usage on a per application or application-function basis embodying program instructions executable in a client device that, when executed by at least one hardware processor, cause the client device to:
    identify that a client application or an operating system of the client device is not configured to analyze an amount of data consumed by the client application over a carrier network;
    identify a first function call made by the client application to the operating system of the client device to invoke a media player function, the media player function being associated with a playback of media content received over the carrier network; and
    replace the first function call with a second function call that, when invoked during an execution of the client application, causes the operating system to provide a management component of the client device with the media content prior to receipt of the media content by the client application, wherein the management component is configured to:
        identify a size of the media content received by the client device over the carrier network;
        communicate the size of the media content received by the client device to a remote computing service; and
        provide the media content to the operating system to cause playback of the media content on the client device by invoking the first function call.

2. The non-transitory computer-readable medium of claim 1, wherein the management component is further configured to replace the first function call with the second function call at a runtime of the client application.

3. The non-transitory computer-readable medium of claim 1, wherein the client application is one of a plurality of client applications executable on the client device; and
    wherein the remote computing service is configured to use the size of the content received by the client device to generate a network usage analysis for each of the plurality of client applications.

4. The non-transitory computer-readable medium of claim 3, wherein the program instructions executable in a client device that, when executed by the at least one hardware processor, further cause the client device to:
    determine that a compliance rule is violated based at least in part on the network usage analysis; and
    perform a remedial action specified by the compliance rule, the remedial action comprising at least one of: notifying an administrator of a management account associated with the client device, disabling network access to the client device, or replenishing a data allotment of a carrier account associated with the client device.

5. The non-transitory computer-readable medium of claim 1, wherein the program instructions executable in a client device that, when executed by the at least one hardware processor, further cause the client device to identify the size of the media content received by the client device over the carrier network in response to a task performed in association with the playback of the media content on the client device.

6. The non-transitory computer-readable medium of claim 5, wherein:
the task is at least one of: a start, a stop, a pause, or a resume of the playback of the media content; and
the size of the media content received by the client device over the carrier network is identified based on detection of a change in a rate of the playback of the media content.

7. The non-transitory computer-readable medium of claim 1, wherein the first function call made by the client application to the operating system of the client device is a call to NSURLSession Objective-C class or a call to NSURLConnection Objective-C class.

8. A system for identifying network usage on a per application or application-function basis, comprising:
a computing device; and
program instructions executable by the computing device that, when executed, cause the computing device to:
identify that a client application or an operating system of the computing device is not configured to analyze an amount of data consumed by the client application over a carrier network;
identify a first function call made by the client application to invoke a media player function on the computing device, the media player function being associated with a playback of media content received over the carrier network; and
replace the first function call with a second function call that, when invoked during an execution of the client application, causes the operating system to provide a management component of the computing device with the media content prior to receipt of the media content by the client application, wherein the management component is configured to:
identify a size of the media content received by the computing device over the carrier network;
communicate the size of the media content received by the computing device to a remote computing service; and
provide the media content for playback on the computing device.

9. The system of claim 8, wherein the management component is further configured to replace the first function call with the second function call at a runtime of the client application.

10. The system of claim 8, wherein the client application is one of a plurality of client applications executable on the computing device; and
wherein the remote computing service is configured to use the size of the content received by the computing device to generate a network usage analysis for each of the plurality of client applications.

11. The system of claim 10, further comprising program instructions executable by the computing device that, when executed, cause the computing device to:
determine that a compliance rule is violated based at least in part on the network usage analysis; and
perform a remedial action specified by the compliance rule, the remedial action comprising at least one of: notifying an administrator of a management account associated with the computing device, disabling network access to the computing device, or replenishing a data allotment of a carrier account associated with the computing device.

12. The system of claim 8, further comprising program instructions executable by the computing device that, when executed, cause the computing device to identify the size of the media content received by the computing device over the carrier network in response to a task performed in association with the playback of the media content on the computing device.

13. The system of claim 12, wherein:
the task is at least one of: a start, a stop, a pause, or a resume of the playback of the media content; and
the size of the media content received by the computing device over the carrier network is identified based on detection of a change in a rate of the playback of the media content.

14. The system of claim 8, wherein the first function call made by the client application to the operating system of the computing device is a call to NSURLSession Objective-C class or a call to NSURLConnection Objective-C class.

15. A method for identifying network usage on a per application or application-function basis, comprising:
identifying that a client application or an operating system of a client device is not configured to analyze an amount of data consumed by the client application over a carrier network;
identifying a first function call made by the client application to invoke a media player function on the client device, the media player function being associated with a playback of media content received over the carrier network; and
replacing the first function call with a second function call that, when invoked during an execution of the client application, causes the operating system to provide a management component of the client device with the media content prior to receipt of the media content by the client application, wherein the management component is configured to:
identify a size of the media content received by the client device over the carrier network;
communicate the size of the media content received by the client device to a remote computing service; and
provide the media content for playback on the client device.

16. The method of claim 15, wherein the management component is further configured to replace the first function call with the second function call at a runtime of the client application.

17. The method of claim 15, wherein the client application is one of a plurality of client applications executable on the computing device; and
wherein the remote computing service is configured to use the size of the content received by the computing device to generate a network usage analysis for each of the plurality of client applications.

18. The method of claim 17, further comprising:
determining that a compliance rule is violated based at least in part on the network usage analysis; and
performing a remedial action specified by the compliance rule, the remedial action comprising at least one of: notifying an administrator of a management account associated with the client device, disabling network access to the client device, or replenishing a data allotment of a carrier account associated with the client device.

19. The method of claim 15, further comprising identifying the size of the media content received by the client device over the carrier network in response to a task performed in association with the playback of the media content on the client device, wherein:
- the task is at least one of: a start, a stop, a pause, or a resume of the playback of the media content; and
- the size of the media content received by the client device over the carrier network is identified based on detection of a change in a rate of the playback of the media content.

20. The method of claim 15, wherein the first function call made by the client application to the operating system of the client device is a call to NSURLSession Objective-C class or a call to NSURLConnection Objective-C class.

* * * * *

UNITED STATES PATENT AND TRADEMARK OFFICE
CERTIFICATE OF CORRECTION

PATENT NO. : 10,581,987 B2
APPLICATION NO. : 15/131067
DATED : March 3, 2020
INVENTOR(S) : Lucas Chen et al.

Page 1 of 1

It is certified that error appears in the above-identified patent and that said Letters Patent is hereby corrected as shown below:

On the Title Page

Item (60), replace priority to U.S. Provisional Patent Application No. 62/489,188 filed July 6, 2015 with priority to U.S. Provisional Patent Application No. 62/189,188 filed July 6, 2015.

Signed and Sealed this
Twenty-fifth Day of August, 2020

Andrei Iancu
*Director of the United States Patent and Trademark Office*